US011321330B1

(12) United States Patent
Pandis et al.

(10) Patent No.: US 11,321,330 B1
(45) Date of Patent: May 3, 2022

(54) COMBINING NESTED DATA OPERATIONS FOR DISTRIBUTED QUERY PROCESSING

(71) Applicant: Amazon Technologies, Inc., Seattle, WA (US)

(72) Inventors: Ippokratis Pandis, Menlo Park, CA (US); Panagiotis Parchas, Berlin (DE); Michail Petropoulos, San Francisco, CA (US); Fabian Oliver Nagel, Mountain View, CA (US); Yannis Papakonstantinou, La Jolla, CA (US)

(73) Assignee: Amazon Technologies, Inc., Seattle, WA (US)

( * ) Notice: Subject to any disclaimer, the term of this patent is extended or adjusted under 35 U.S.C. 154(b) by 667 days.

(21) Appl. No.: 16/140,420

(22) Filed: Sep. 24, 2018

Related U.S. Application Data

(60) Provisional application No. 62/690,302, filed on Jun. 26, 2018.

(51) Int. Cl.
| | |
|---|---|
| *G06F 16/00* | (2019.01) |
| *G06F 16/2458* | (2019.01) |
| *G06F 16/28* | (2019.01) |
| *G06F 16/22* | (2019.01) |
| *G06F 16/2453* | (2019.01) |

(52) U.S. Cl.
CPC ...... *G06F 16/2471* (2019.01); *G06F 16/2282* (2019.01); *G06F 16/24535* (2019.01); *G06F 16/283* (2019.01)

(58) Field of Classification Search
CPC ............. G06F 16/2471; G06F 16/2282; G06F 16/283; G06F 16/24535
See application file for complete search history.

(56) References Cited

U.S. PATENT DOCUMENTS

| | | | |
|---|---|---|---|
| 6,105,017 A | 8/2000 | Kleewein et al. | |
| 8,005,854 B2 | 8/2011 | Chawla et al. | |
| 8,086,598 B1* | 12/2011 | Lamb ................ | G06F 16/24544 707/714 |
| 8,122,008 B2 | 2/2012 | Li et al. | |
| 2014/0280032 A1* | 9/2014 | Kornacker ......... | G06F 16/2471 707/718 |

OTHER PUBLICATIONS

Elasticsearch: The Definitive Guide [2.x], retrieved on Feb. 18, 2021, retrieved from the Internet <URL: https://www.elastic.co/guide/en/elasticsearch/guide/current/index.html > (Year: 2014).*

(Continued)

*Primary Examiner* — Tyler J Torgrimson
(74) *Attorney, Agent, or Firm* — Robert C. Kowert; Kowert, Hood, Munyon, Rankin & Goetzel, P.C.

(57) ABSTRACT

A query that references nested data may have sub-expressions included in a subquery for nested data to perform the query. A first query engine may rewrite the query to include one or more sub-expressions that reference the nested data into a subquery for the nested data as part of generating a plan to perform the query. A second query engine may then be caused to perform the subquery for the nested data. A result of the query may be inclusive of the performance of the subquery at the second query engine.

20 Claims, 19 Drawing Sheets

(56) References Cited

OTHER PUBLICATIONS

Elasticsearch Reference [2.4], retrieved on Feb. 18, 2021, retrieved from the Internet <URL: https://www.elastic.co/guide/en/elasticsearch/reference/2.4/index.html> (Year: 2017).*

Elasticsearch Reference [6.0], 2017, retrieved on Feb. 18, 2021, retrieved from the Internet <URL: https://www.elastic.co/guide/en/elasticsearch/reference/6.0/index.html> (Year: 2017).*

U.S. Appl. No. 15/389,318, filed Dec. 22, 2016, Ippokratis Pandis et al.

* cited by examiner

```
                                                              710
SELECT n.d

FROM table r, nested table s, s.nested n
                                              could be obtained
WHERE n.b = r.a AND EXISTS (SELECT 1 FROM     from same remote
s.secondnested n2 WHERE n2.c=1)               scan operation
                                                             712
```

FIG. 7A

```
                                                              720
SELECT iq.d                       combined sub-
                                  query expressions
FROM table r,                          722 nested subquery (SELECT n.d AS d, n.b AS b FROM
nested table s, s.nested n WHERE EXISTS (SELECT 1 FROM
s.secondnested n2 WHERE n2.c=1)) iq WHERE iq.b = r.a
```

FIG. 7B

```
                                                              query 810
SELECT n.d FROM table r, nested_table s, s.nested n WHERE n.b = r.a AND EXISTS (SELECT 1 FROM s.secondnested
                             n2 WHERE n2.c = r.c)
```
could not be obtained from
same remote scan operation
812

*FIG. 8A*

```
                                                    intermediate query 820
SELECT n.d FROM table  r AT rid, nested table s AT sid,
s.nested n AT nid, s.secondnested n2
                                              could be obtained
                                              from same remote
WHERE n.b = r.a AND n2.c = r.c                 scan operation
                                                     822
GROUP BY rid, sid, nid, n.d
```

*FIG. 8B*

```
                                              from clause left deep inner join query 910

FROM (
      (table1 r LEFT JOIN table2 r2 ON r1.c = r2.d)
       INNER JOIN table3 s ON r.a=s.b
      )
INNER JOIN s.nested n
```

```
                                              intermediate rewrite of query 912
FROM (local_table1 r1 LEFT JOIN local_table2 r2 ON r1.c = r2.d)

INNER JOIN (remote_table s INNER JOIN s.nested n) ON r.a=s.b
```

```
                                              rewritten query 920
FROM (local_table1 r1 LEFT JOIN local_table2 r2 ON r1.c = r2.d)

INNER JOIN (
            nesting subquery (
                remote_table s INNER JOIN s.nested n
            ) ON r.a=s.b
```

FIG. 9

```
                                              doubly correlated EXIST query 1010
SELECT sv.out FROM S sv WHERE EXISTS (SELECT * FROM sv.n n, R rv WHERE n = rv.j
              AND rv.foo = 3)
```

```
                                              intermediate rewrite of query 1012
SELECT sv.out FROM S sv, sv.n n, R rv WHERE n = rv.j AND rv.foo = 3

GROUP BY sv.oid, sv.out
```

```
                                              rewritten query 1020
SELECT sv1.out FROM
    nested subquery (
                     SELECT sv.oid AS oid, sv.out AS
                     out, n AS n FROM S sv, sv.n n
                     ) sv1, R rv WHERE sv1.n = rv.j AND rv.foo = 3

GROUP BY sv1.oid, sv1.out
```

*FIG. 10A*

```
                                                    query with a scalar subquery in WHERE clause 1110
SELECT sv.out FROM S sv WHERE 5 = (SELECT sv.s FROM sv.n n, R rv WHERE n = rv.j
           AND rv.foo = 3)
```

```
                                                    intermediate rewrite of query 1112
SELECT sv.out FROM S sv, sv.s, sv.n, R rv WHERE sv.n = rv.j AND rv.foo = 3

GROUP BY sv.oid, sv.out, sv.s

HAVING COUNT (*) = 1 AND 5 = sv.s
```

```
                                                    rewritten query 1120
SELECT sv1.out

FROM nested subquery (SELECT sv.oid AS oid, sv.out AS
                     out, n AS n FROM S sv, sv.n n)
    sv1, R rv WHERE sv1.n = rv.j AND rv.foo = 3

GROUP BY sv1.oid, sv1.out, sv1.s

HAVING COUNT (*) = 1 AND 5 = sv1.s
```

FIG. 11A

*query with an aggregate doubly-correlated subquery in the WHERE clause 1210*

```
SELECT rv.a, sv.b

FROM R rv INNER JOIN S sv ON rv.k = sv.k

WHERE 5 < (SELECT COUNT (*) FROM sv.n nv WHERE nv.j = rv.j)
```

*normalized query 1220*

```
SELECT rv.a, sv.b

FROM (R rv INNER JOIN S sv ON rv.k = sv.k)
     LEFT JOIN sv.n nv ON nv.j = rv.j

GROUP BY rv.id, rv.a, sv.id, sv.b

HAVING 5 < COUNT (nv.id)
```

*rewritten query with isolation 1230*

```
SELECT flat.a, flat.b

FROM (R rv INNER JOIN nested subquery (FROM S sv LEFT sv.n nv
                         SELECT sv.id AS svid, sv.b AS b)
        ON rv.k = sv.k)

GROUP BY rv.id, rv.a, sv.id, sv.b,

CASE WHEN nv.j = rv.j THEN nv.id
                ELSE null

SELECT rv.id AS rvid, rv.a, sv1.svid AS svid, sv1.b
        ) flat

GROUP BY flat.rvid, flat.svid, flat.a, flat.b

HAVING 5 < COUNT (nv.id)
```

*FIG. 12*

```
                                      query with a doubly-correlated EXISTS and aggregation 1310
SELECT sv.out, SUM(m)

FROM S sv, sv.m m

WHERE EXISTS  (
                SELECT * FROM sv.n n, R rv
                WHERE n = rv.j AND rv.foo = 3
                )

GROUP BY sv.out
```

```
                                              intermediate rewrite of query 1312
SELECT sv.out, SUM(m)

FROM S sv, sv.n n, sv.m AS m AT mpos, R rv

WHERE n = rv.j AND rv.foo = 3

GROUP BY sv.mpos, sv.out, sv.m
```

```
                                                      rewritten query 1320
SELECT dv.out, SUM(dv.m)

FROM (SELECT sv1.out AS out, sv1.m AS m
      FROM
      nested subquery (
                      SELECT sv.out AS out, n AS n, mpos AS
                         mpos, m AS m
                      FROM S sv, sv.n n, sv.m AS m AT mpos)
                      )
      sv1, R rv
      WHERE sv1.n = rv.j AND rv.foo = 3
      GROUP BY sv1.mpos, sv1.out, sv1.m
      ) dv GROUP BY dv.out
```

FIG. 13

```
                                              query with nested query decorrelation 1410
SELECT sv.out AS out, SUM (
                             SELECT rv.offset + n FROM sv.n n
                           ) AS sumrn FROM S sv, R rv WHERE sv.j = rv.j AND rv.foo = 3
```

```
                                              intermediate rewrite of query 1412
SELECT sv1.out, SUM( rv.offset + sv.n) AS sumrn FROM S sv, sv.n n, R rv WHERE sv.j = rv.j AND rv.foo = 3

GROUP BY sv.oid, sv.out, rv.oid
```

```
                                                      rewritten query 1420
SELECT sv1.out, SUM( rv.offset + sv1.n)

FROM nested subquery (
                    SELECT sv.oid AS sv_oid, sv.out AS out,
                    sv.j AS j, n AS n FROM S sv, sv.n n
                    ) sv1, R rv WHERE sv1.j = rv.j AND rv.foo = 3

GROUP BY sv1.sv_oid, sv1.out, rv.oid
```

*FIG. 14*

```
                                                      query with WITH clause 1510
WITH tempt AS
     (
        SELECT sv.a, nv.b
        FROM R rv INNER JOIN S sv INNER JOIN sv.n nv
        WHERE rv.k = nv.k
     )

SELECT t.a, t.b

FROM tempt t

GROUP BY t.a
```

```
                                                     intermediate rewrite of query 1512
WITH tempt AS
     (
        SELECT sv.a, nv.b, nv.k
        FROM R rv INNER JOIN S sv INNER JOIN sv.n nv WHERE rv.k = nv.k
     )

SELECT t.a, t.b

FROM tempt t

GROUP BY t.a
```

```
                                                      rewritten query 1520
WITH tempt AS
     (
        SELECT sv.a, nv.b
        FROM R rv INNER JOIN
            nested subquery(
                            SELECT sv.a, nv.b, nv.k
                            FROM S sv INNER JOIN sv.n nv
                            ) d
        WHERE rv.k = d.k
     )

SELECT t.a, t.b

FROM tempt t

GROUP BY t.a
```

*FIG. 15*

COMBINING NESTED DATA OPERATIONS FOR DISTRIBUTED QUERY PROCESSING

RELATED APPLICATIONS

This application claims benefit of priority to U.S. Provisional Application Ser. No. 62/690,302, entitled "COMBINING NESTED DATA OPERATIONS FOR DISTRIBUTED QUERY PROCESSING," filed Jun. 26, 2018, and which is incorporated herein by reference in its entirety.

BACKGROUND

As the technological capacity for organizations to create, track, and retain information continues to grow, a variety of different technologies for managing and storing the rising tide of information have been developed. Different storage systems, database systems, and other data processing platforms may provide clients with standard or customized configurations of hardware and software to manage stored information. Because many data management and storage solutions are available, it is difficult for users to select a data management and solution that satisfies current storage needs without blocking future data accessibility as data management and storage solutions change. Therefore, data often becomes stored or distributed across different locations, in different formats, making subsequent attempts to analyze or otherwise process the distributed data collectively difficult to perform.

BRIEF DESCRIPTION OF THE DRAWINGS

FIGS. 7A and 7B illustrate an example rewrite of a query that isolates nested data, according to some embodiments.

FIGS. 8A-8B illustrate an example rewrite of a query to create an intermediate rewrite of a query, according to some embodiments.

FIGS. 9-15 illustrate various example rewrites of a query to include a subquery for nested data, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of combining nested data operations for distributed query processing are described herein. Nested data may be stored as part of data objects, files, logs, documents, or other data, in various embodiments. Queries to access the nested data may have to be able to interpret the nested format of the data in order to correctly apply the query, in some embodiments. In distributed processing environments where, for example, one query engine performs processing for portions of a query directed to local data and another query engine handles processing operations for the query directed to remote data, planning for handling nested data may be implemented as part of planning to perform the query so that a query engine which may not normally support queries to nested data (e.g., the first query engine) may be still be able to perform and apply queries to nested data via a second query engine which does support nested query processing, in some embodiments.

Figure 1:
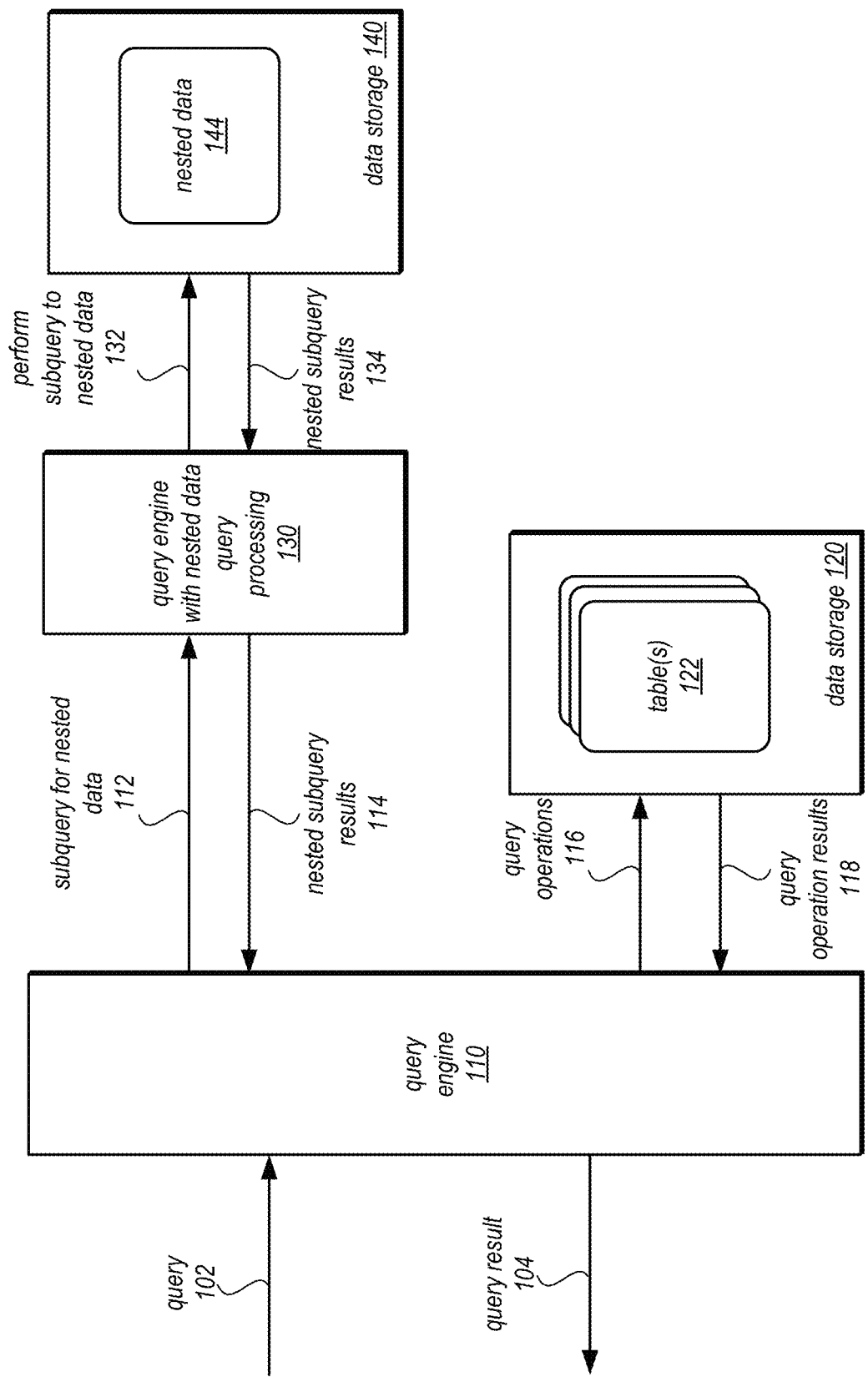
FIG. 1 is a logical block diagram of combining nested data operations for distributed query processing, according to some embodiments.

Combining nested data operations may be implemented in various embodiments to improve the performance of a query engine that does not directly support queries to nested data by identifying, planning, and directing the performance of query via other query engines that do support the performance of queries to nested data (e.g., relieving the first query engine from having to be upgraded, altered, or perform operations for which it is not optimized). FIG. 1 is a logical block diagram of combining nested data operations for distributed query processing, according to some embodiments. Query engine 110 may be a query engine implemented as part of a database system or other data storage interface that performs and/or supports queries to various types of data (e.g., relational data, non-relational data, graph data, etc.). However, in at least some embodiments query engine 110 may not support (e.g., be capable of performing) queries over nested data directly and thus instead may utilize query engine with nested data query processing 130 (which may be implemented as part of a separate database system, query engine, or other host system, such as format independent data processing nodes as discussed below with regard to FIGS. 2-6). In other embodiments, query engine 110 may support operations to perform queries over some (e.g., local) nested data, but may still utilize the techniques described below to leverage additional query processing resources (e.g., query engine with nested data query processing 130) to handle queries to nested data (e.g., nested data stored in a different location, such as data storage 140 that is accessible to query engine with nested data query processing 130) instead of data storage 120.

Query engine 110 may implement various operations to formulate, translate, replace, alter, or otherwise rewrite a received query 102 that is directed to nested data 144 in data storage. As discussed in detail below with regard to FIGS. 6-14, various rewrite rules to isolate and combine portions or other sub-expressions of query 102 that reference nested data 144 may be included in a subquery that is sent (including normalization operations to rewrite queries into intermediate forms which can then be analyzed under isolation techniques) as indicated at 112 to query engine with nested data query processing 130. For instance, sub-expressions that are both reference nested data and non-nested data (e.g., in a different table) may be rewritten so that only those sub-expressions that reference the nested data are included in a subquery for nested data (e.g., 112) to be sent to be performed over nested data 144 in data storage 140 (e.g., in one pass or scan over nested data 144 or a scan over a larger data structure such as a table). Query engine with nested data query processing 130 may perform the subquery 132 to data storage 140 (e.g., remote storage servers, storage system, or storage service), and return results 134 and 114 to query engine 110.

Figure 3:
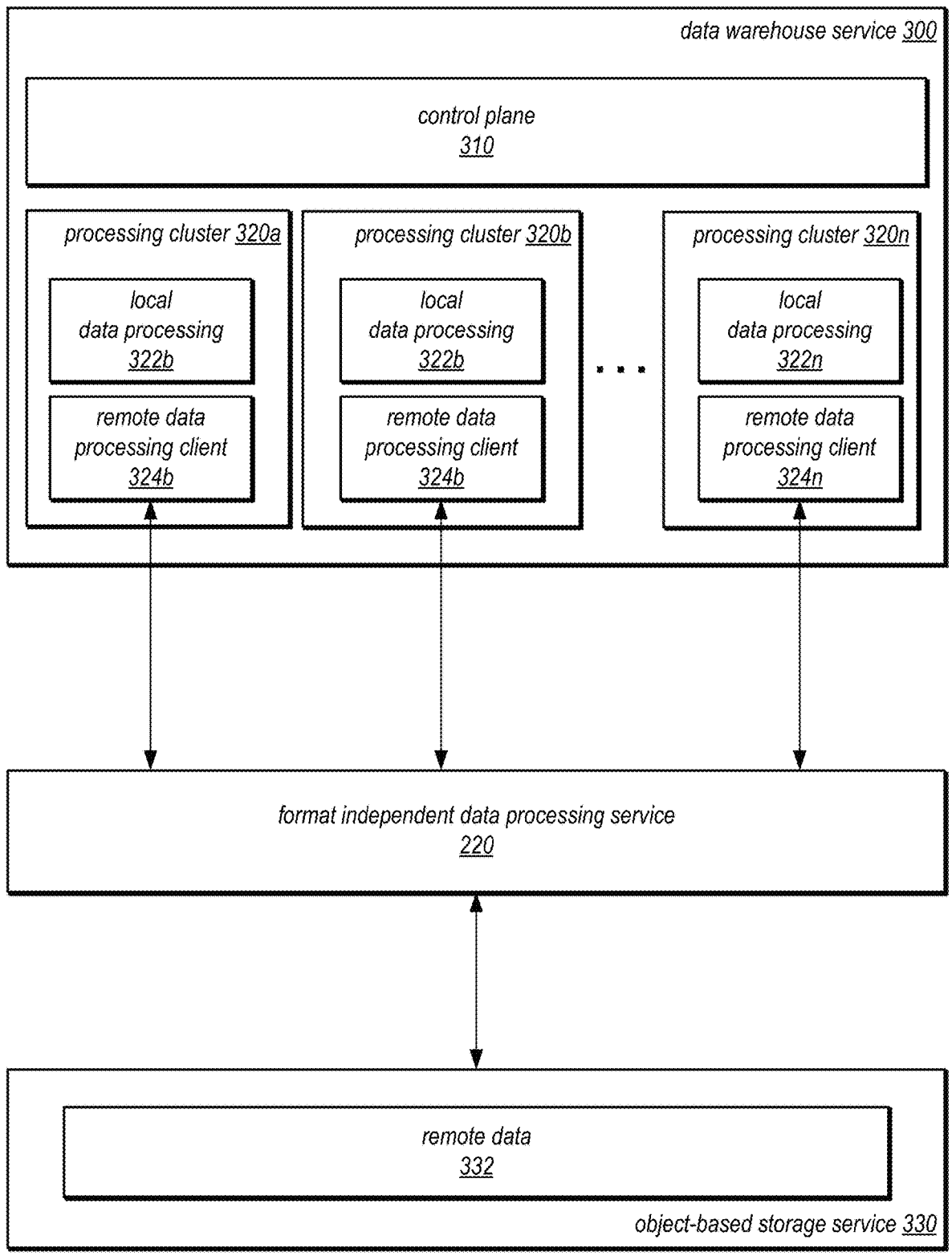
FIG. 3 is a logical block diagram of a data warehouse service that combines nested data operations when utilizing a format independent data processing service to perform federated processing for data stored outside of the data warehouse service, according to some embodiments.

Query 102 may include features, predicates, elements, sub-expressions or other portions which are directed to table(s) 122 in data storage 120 (e.g., directly attached storage devices, network attached storage within a local or private network, or storage within a same service or system boundary as query engine 110, such as storage implemented as part of a data warehouse service—as opposed to storage in an object-based storage service as discussed below with regard to FIGS. 3 and 5). Query engine 110 may also perform query operations 116 to data storage 120 to access table(s) 122 (e.g., perform operations to scan, aggregate, filter, or otherwise return the results that satisfy the features of query 102 with respect to table 122. In some scenarios, query 102 may join nested data retrieved by a subquery to query engine with nested data query processing 130 with results from table(s) 142 obtained by query engine 110, as discussed below in various examples. In some embodiments, the subquery results 114 and query operation results 118 may be used to generate and return a query result 104, in some embodiments. In some embodiments, subquery results 114 alone may be used to satisfy the query 102.

Please note that the previous description of combining nested data operations for distributed query processing is a logical illustration and thus is not to be construed as limiting as to the implementation of a data processor, a data store, a data set (or portions thereof), number or combination of nodes in a set.

This specification begins with a general description of a provider network that implements multiple different services, including data processing services and storage services, which may perform combining nested data operations for distributed query processing. Then various examples of multiple data processors, such as a data warehouse service and a format independent data processing service, including different components/modules, or arrangements of components/module that may be employed as part of implementing the data processors are discussed. A number of different methods and techniques to implement combining nested data operations for distributed query processing are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
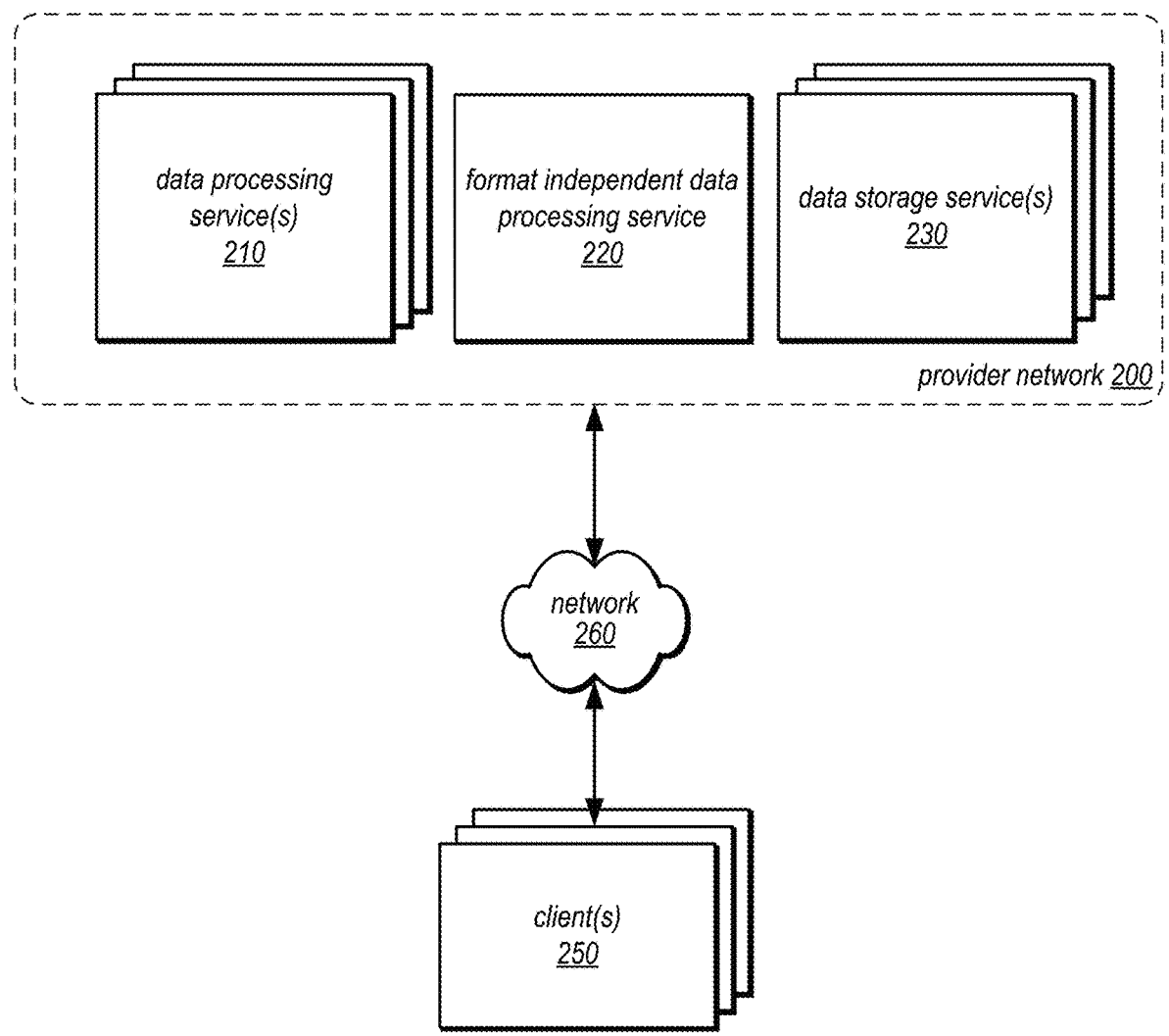
FIG. 2 is a logical block diagram illustrating a provider network offering data processing services that utilize a format independent data processing service, according to some embodiments.

FIG. 2 is a logical block diagram illustrating a provider network offering data processing services that utilize a format independent data processing service, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 2000 described below with regard to FIG. 17), needed to implement and distribute the infrastructure and storage services offered by the provider network 200. In some embodiments, provider network 200 may implement various computing resources or services, such as data processing service(s) 210, (e.g., a map reduce service, a data warehouse service, and other large scale data processing services or database services), format independent data processing service 220, and data storage services 230 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 17 and described below. In various embodiments, the functionality of a given system or service component (e.g., a component of data processing service 210, format independent data processing service 220, or data storage service 230) may be implemented by a particular node or may be distributed across several nodes. In some embodiments, a given node may implement the functionality of more than one service system component (e.g., more than one data store component).

Data processing services 210 may be various types of data processing services that perform general or specialized data processing functions (e.g., anomaly detection, machine learning, data mining, big data querying, or any other type of data processing operation). For example, in at least some embodiments, data processing services 210 may include a map reduce service that creates clusters of processing nodes that implement map reduce functionality over data stored in the map reduce cluster as well as data stored in one of data storage services 230. In another example, data processing service(s) 210 may include various types of database services (both relational and non-relational) for storing, querying, and updating data. Such services may be enterprise-class database systems that are highly scalable and extensible. Queries may be directed to a database in data processing service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, data processing service(s) 210 may implement, in some embodiments, a data warehouse service, such as discussed below with regard to FIG. 3 that utilizes another data processing service, such as format independent data processing service 220, to execute portions of queries or other access requests with respect to data that is stored in a remote data store, such as data storage service(s) 230 (or a data store external to provider network 200) to implement tiered data processing for distributed data sets.

Format independent data processing service 220, as discussed in more detail below with regard to FIGS. 3-6, may provide a service supporting many different data or file formats for data stored in a centralized data store, like one (or more) of data storage service(s) 230. Instead of reformatting (if the format of data in remote storage is not supported by the data processing service(s) 210) and moving data from data storage service(s) 230 into the data processing service(s) 210, format independent data processing service 220 may efficiently read data from data storage service(s) 230 according to the data format in which the data is already stored in data storage service(s) 230.

Format independent data processing service may perform requested operations, such as scan operations that filter or project data results, aggregation operations that aggregate data values and provide partial or complete aggregation results, sorting, grouping, or limiting operations that organize or reduce the determined data results from data in data storage service(s) 230 in order to minimize the amount of data transferred out of data storage service(s) 230. For example, format independent data processing service 220 may execute different operations that are part of a larger query plan generated at a data processing service 210 (such as discussed above with regard to FIG. 1 and below with regard to FIGS. 5-15) and provide results to the data processing service 210 by relying upon requests from data processing service(s) 210 to determine the different operations to perform. In this way, format independent data processing service 220 may be implemented as a dynamically scalable and stateless data processing service that is fault tolerant without the need to support complex query planning and execution for multiple different data formats. Instead, format independent data processing service 230 may offer a set of data processing capabilities to access data stored in a wide variety of data formats (which may not be supported by different data processing service(s) 210) that can be programmatically initiated on behalf of another data processing client, such as data processing service 210.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds of object or file data stores for putting, updating, and getting data objects or files. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as audio files and web site log files. Data storage service(s) 230 may be accessed via programmatic interfaces (e.g., APIs) or graphical user interfaces. For example, format independent data processing service 220 may access data objects stored in data storage services via the programmatic interfaces (as discussed below with regard to FIG. 12).

Generally speaking, clients 250 may encompass any type of client that can submit network-based requests to provider network 200 via network 260, including requests for storage services (e.g., a request to query a data processing service 210, or a request to create, read, write, obtain, or modify data in data storage service(s) 230, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of data processing service(s) 210, format independent data processing service 220, or storage resources in data storage service(s) 230 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 230 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 230 may be coordinated by client 250 and the operating system or file system on behalf of applications executing within the operating system environment. Similarly, a client 250 may be an analytics application that relies upon data processing service(s) 210 to execute various queries for data already ingested or stored in the data processing service (e.g., such as data maintained in a data warehouse service, like data warehouse service 300 in FIG. 3 below) or data stored in a data lake hosted in data storage service(s) 230 by performing federated data processing between the data processing service 210 and format independent data processing service 220 (as discussed below with regard to FIGS. 5-15).

Clients 250 may convey network-based services requests (e.g., access requests to read or write data may be directed to data in data storage service(s) 230, operations, tasks, or jobs, being performed as part of data processing service(s) 220, or to interact with data catalog service 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In at least some embodiments, one of data processing service(s) 220 may be a data warehouse service. FIG. 3 is a logical block diagram of a data warehouse service that combines nested data operations when utilizing a format independent data processing service to perform federated processing for data stored outside of the data warehouse service, according to some embodiments. A data warehouse service, such as data warehouse service 300, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as may be equally adapted to implement embodiments for various other types of relational database systems, such as row-oriented database systems. Therefore, the following examples are not intended to be limiting as to various other types or formats of relational database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Data warehouse service 300 may be implemented by a large collection of computing devices, such as customized or off-the-shelf computing systems, servers, or any other combination of computing systems or devices, such as the various types of systems 2000 described below with regard to FIG. 17. Different subsets of these computing devices may be controlled by control plane 310. Control plane 310, for example, may provide a cluster control interface to clients or users who wish to interact with the processing clusters 320 managed by control plane 310. For example, control plane 310 may generate one or more graphical user interfaces (GUIs) for storage clients, which may then be utilized to select various control functions offered by the control interface for the processing clusters 320 hosted in the data warehouse service 300.

As discussed above, various clients (or customers, organizations, entities, or users) may wish to store and manage data using a data management service. Processing clusters may respond to various requests, including write/update/store requests (e.g., to write data into storage) or queries for data (e.g., such as a Server Query Language request (SQL) for particular data), as discussed below with regard to FIG. 5, along with many other data management or storage services. Multiple users or clients may access a processing cluster to obtain data warehouse services. In at least some embodiments, a data warehouse service 300 may provide network endpoints to the clusters which allow the clients to send requests and other messages directly to a particular cluster. Network endpoints, for example may be a particular network address, such as a URL, which points to a particular cluster. For instance, a client may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Processing clusters, such as processing clusters 320a, 320b, through 320n, hosted by the data warehouse service 300 may provide an enterprise-class database query and management system that allows users to send data processing requests to be executed by the clusters 320, such as by sending a query to a cluster control interface implemented by the network-based service. Processing clusters 320 may perform data processing operations with respect to data stored locally in a processing cluster, as well as remotely stored data. For example, object-based storage service 330 may be a data storage service 230 implemented by provider network 200 that stores remote data 322. Queries sent to a processing cluster 320 may be directed to local data stored in the processing cluster and/or remote data 322. Therefore, processing clusters may implement local data processing, such as local data processing 322a, 322b, through 322n to plan and execute the performance of queries with respect to local data in the processing cluster, as well as a remote data processing client, such as remote data processing clients 324a, 324b, through 324n, to direct execution of different operations determined as part of the query plan generated at the processing cluster that are assigned to format independent data processing service 220 with respect to processing remote data 332. In at least some embodiments, local data processing 322 may not support operations over nested data, where as in other embodiments local data processing 322 may support operations over local nested data but may rely upon format independent data processing service 220 to perform operations over nested data in remote data 332.

Scaling clusters 320 may allow users of the network-based service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently.

Figure 4:
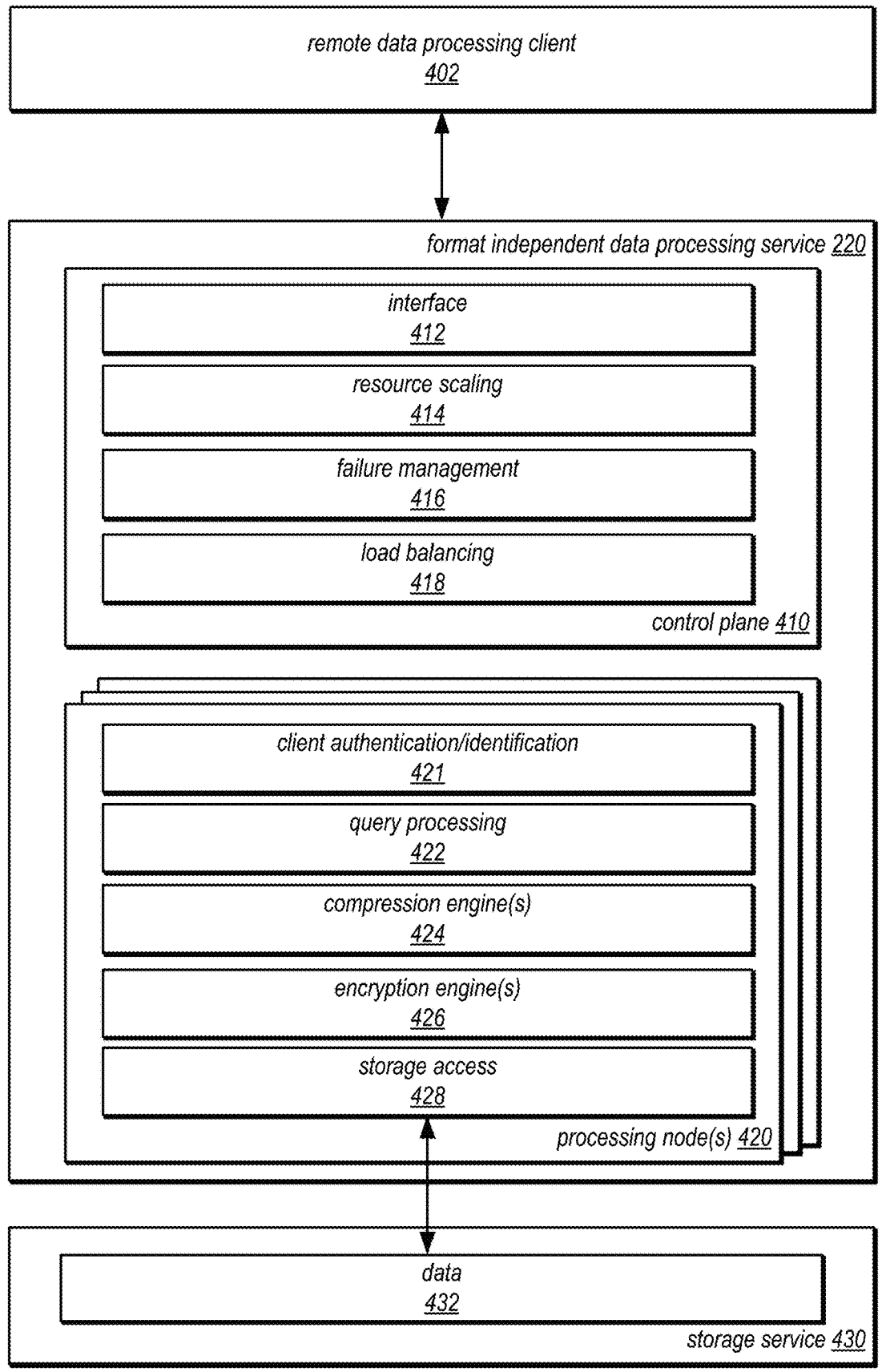
FIG. 4 is a logical block diagram illustrating a format independent data processing service, according to some embodiments.

FIG. 4 is a logical block diagram illustrating a format independent data processing service, according to some embodiments. As noted above in FIG. 2, format independent data processing service 220 may receive requests to perform processing operations with respect to data stored 432 stored in a data storage service. Processing requests may be received from a client, such as remote data processing client(s) 402 (which may another data processing service 210, like data warehouse service 300 or another data processing client, such as a database engine/cluster or map reduce cluster implemented outside of provider network 200 and communicating with format independent data processing service 220 in order to process queries with respect to data stored within provider network 200 in a data storage service 230 or to process data stored outside of provider network 200 (when the data is made accessible to format independent data processing service 220).

Format independent data processing service 220 may implement a control plane 410 and multiple processing node(s) 420 to execute processing requests received from remote data processing client(s) 402. Control plane 410 may arbitrate, balance, select, or dispatch requests to different processing node(s) 420 in various embodiments. For example, control plane 410 may implement interface 412 which may be a programmatic interface, such as an application programming interface (API), that allows for requests to be formatted according to the interface 412 to programmatically invoke operations. In some embodiments, the API may be defined to allow operation requests defined as objects of code generated at and sent from remote data processing client(s) 402 (based on a query plan generated at remote data processing client(s) 402) to be compiled or executed in order to perform the assigned operations at format independent data processing service 220.

In some embodiments, format independent data processing service 220 may implement load balancing 418 to distribute remote processing requests across different processing node(s) 420. For example, a remote processing request received via interface 412 may be directed to a network endpoint for a load-balancing component of load balancing 418 (e.g., a load balancing server or node) which may then dispatch the request to one of processing node(s) 420 according to a load balancing scheme. A round-robin load balancing, for instance, may be used to ensure that remote data processing requests are fairly distributed amongst processing node(s) 420. However, various other load-balancing schemes may be implemented. As format independent data processing service 220 may receive many remote data processing requests from multiple remote data processing client(s) 402, load balancing 418 may ensure that incoming requests are not directed to busy or overloaded processing node(s) 420.

Format independent data processing service 220 may also implement resource scaling 414. Resource scaling 414 may detect when the current request rate or workload upon a current number of processing node(s) 420 exceeds or falls below over-utilization or under-utilization thresholds for processing nodes. In response to detecting that the request rate or workload exceeds an over-utilized threshold, for example, then resources scaling 414 may provision, spin up, activate, repurpose, reallocate, or otherwise obtain additional processing node(s) 420 to processing received remote data processing requests. Similarly, the number of processing node(s) 420 could be reduced by resource scaling 414 in the event that the request rate or workload of processing node(s) falls below the under-utilization threshold.

Format independent data processing service 220 may also implement failure management 416 to monitor processing node(s) 420 and other components of format independent data processing service 220 for failure or other health or performance states that may need to be repaired or replaced. For example, failure management 416 may detect when a processing node fails or becomes unavailable (e.g., due to a network partition) by polling processing node(s) 420 to obtain health or performance status information. Failure management may initiate shutdown or halting of processing at failing processing node(s) 420 and provision replacement processing node(s) 420.

Figure 17:
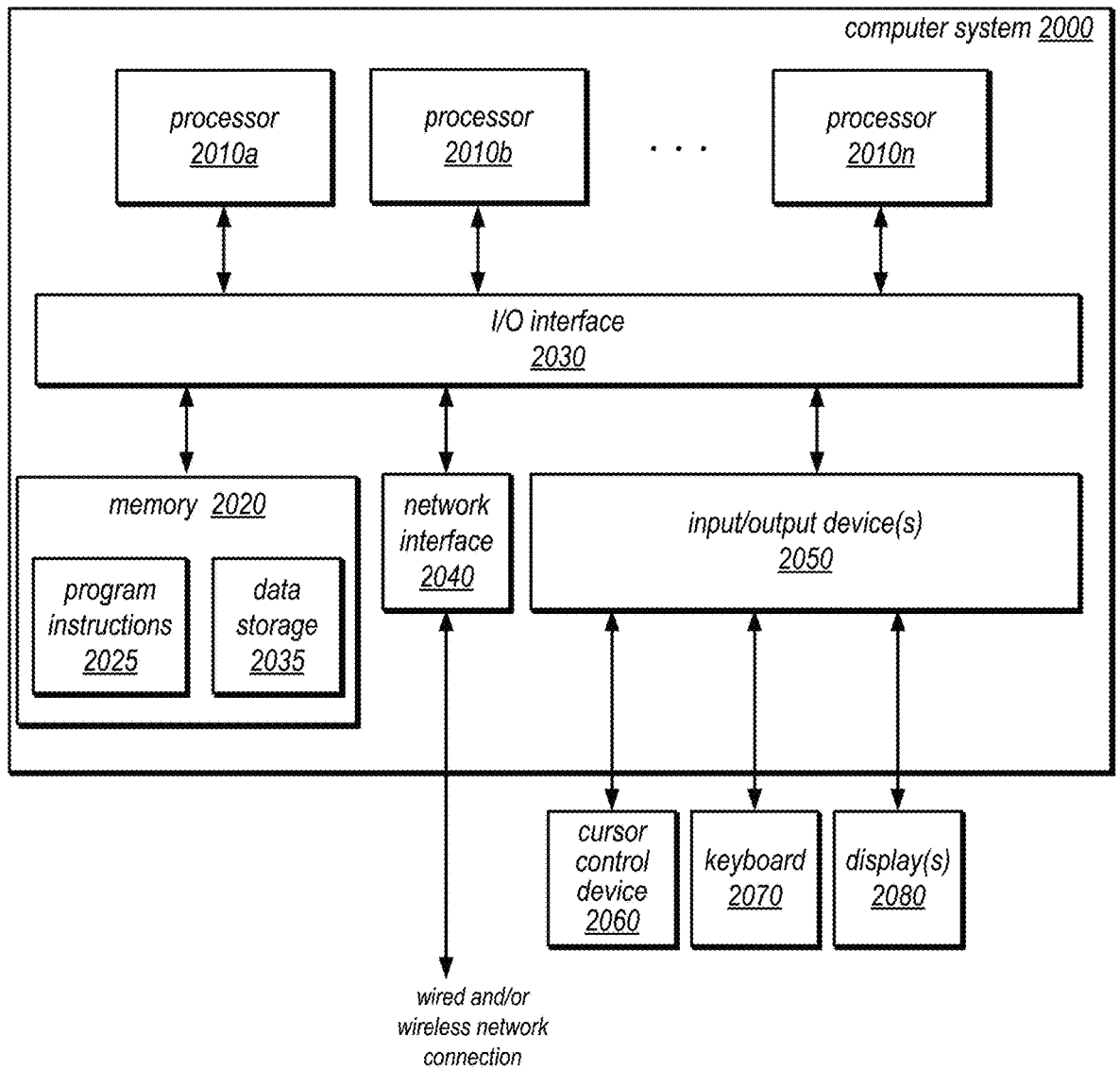
FIG. 17 illustrates an example system that implements the various methods, techniques, and systems described herein, according to some embodiments.

Processing node(s) 420 may be implemented as separate computing nodes, servers, or devices, such as computing systems 2000 in FIG. 17, to perform data processing operations on behalf of remote data processing client(s) 402. Processing node(s) 420 may implement stateless, in-memory processing to execute processing operations, in some embodiments. In this way, processing node(s) 420 may have fast data processing rates. Processing node(s) 420 may implement client authentication/identification 421 to determine whether a remote data processing client 402 has the right to access data 432 in storage service 430. For example, client authentication/identification 421 may evaluate access credentials, such as a username and password, token, or other identity indicator by attempting to connect with storage service 430 using the provided access credentials. If the connection attempt is unsuccessful, then the data processing node 402 may send an error indication to remote data processing client 402.

Processing node(s) 420 may implement query processing 422 which may perform multiple different processing operations and support multiple different data formats. For example, query processing 422 may implement separate tuple scanners for each data format which may be used to perform scan operations that scan data 432 and which may filter or project from the scanned data, search (e.g., using a regular expression) or sort (e.g., using a defined sort order) the scanned data, aggregate values in the scanned data (e.g., count, minimum value, maximum value, and summation), and/or group by or limit results in the scanned data. Remote data processing requests may include an indication of the data format for data 432 so that query processing 422 may use the corresponding tuple scanner for data 432. Query processing 422 may, in some embodiments, transform results of operations into a different data format or schema according to a specified output data format in the remote data processing request. Query processing 422 may scan nested data and perform operations to "un-nest" or "flatten" data according to received sub-queries, as discussed below, in some embodiments, so that the receiving query engine can treat the data as "un-nested."

In some embodiments, data 432 may be stored in encrypted or compressed format. Processing node(s) 420 may implement compression engine(s) 424 to decompress data 432 according to a compression technique identified for data 432, such as lossless compression techniques like run-length encoding, Lempel-Ziv based encoding, or bzip based encoding. Processing node(s) 420 may implement encryption engine(s) 426 to decrypt data 432 according to an encryption technique and/or encryption credential, such as a key, identified for data 432, such as symmetric key or public-private key encryption techniques.

Processing node(s) 420 may implement storage access 428 to format, generate, send and receive requests to access data 432 in storage service 430. For example, storage access 428 may generate requests to obtain data according to a programmatic interface for storage service 430. In some embodiments, other storage access protocols, such as internet small computer interface (iSCSI), may be implemented to access data 432.

Figure 5:
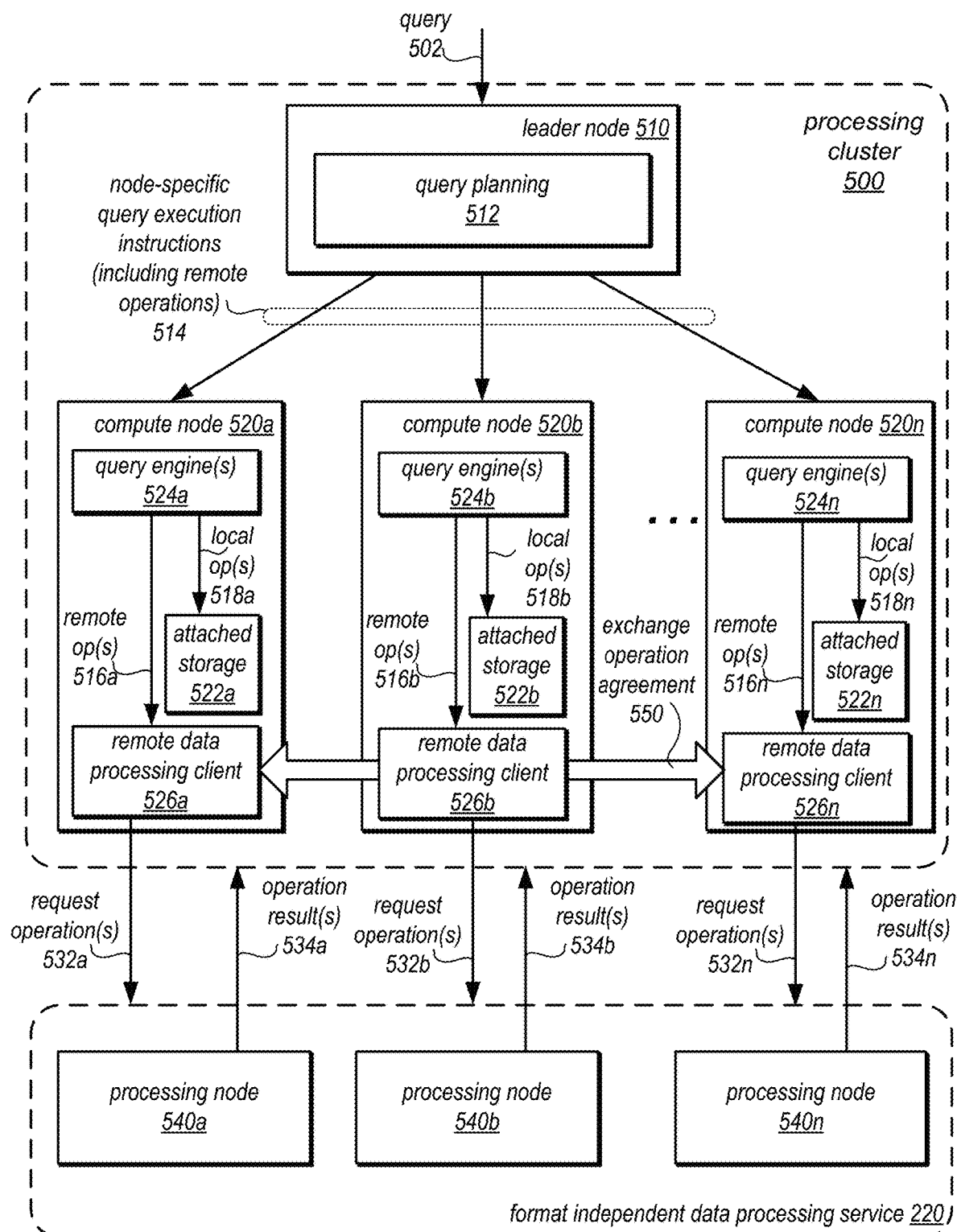
FIG. 5 is a logical block diagram illustrating an example processing cluster of a data warehouse service using a format independent data processing service to perform combined nested data operations at a remote data store for a query, according to some embodiments.

FIG. 5 is a logical block diagram illustrating an example processing cluster of a data warehouse service using a format independent data processing service to perform operations at a remote data store to perform federated processing for a query, according to some embodiments. Processing cluster 500 may be data warehouse service cluster, like processing clusters 320 discussed above with regard to FIG. 3, or another processing cluster that distributes execution of a query among multiple processing nodes. As illustrated in this example, a processing cluster 500 may include a leader node 510 and compute nodes 520a, 520b, and 520n, which may communicate with each other over an interconnect (not illustrated). Leader node 510 may implement query planning 512 (discussed in detail below with regard to FIG. 6) to generate query plan(s) and instructions 514 for executing queries on processing cluster 500 that perform tiered data processing. As described herein, each node in a processing cluster 500 may include attached storage, such as attached storage 522a, 522b, and 522n, on which a database (or portions thereof) may be stored on behalf of clients (e.g., users, client applications, and/or storage service subscribers).

Note that in at least some embodiments, query processing capability may be separated from compute nodes, and thus in some embodiments, additional components may be implemented for processing queries. Additionally, it may be that in some embodiments, no one node in processing cluster 500 is a leader node as illustrated in FIG. 5, but rather different nodes of the nodes in processing cluster 500 may act as a leader node or otherwise direct processing of queries to data stored in processing cluster 500. While nodes of processing cluster may be implemented on separate systems or devices, in at least some embodiments, some or all of processing cluster may be implemented as separate virtual nodes or instance on the same underlying hardware system (e.g., on a same server).

In at least some embodiments, processing cluster 500 may be implemented as part of a data warehouse service, as discussed above with regard to FIG. 3, or another one of data processing service(s) 210. Leader node 510 may manage communications with clients, such as clients 250 discussed above with regard to FIG. 2. For example, leader node 510 may be a server that receives a query 502 from various client programs (e.g., applications) and/or subscribers (users), then parses them and develops an execution plan (e.g., query plan(s)) to carry out the associated database operation(s)). More specifically, leader node 510 may develop the series of steps necessary to obtain results for the query. Query 502 may be directed to data that is stored both locally within processing cluster 500 (e.g., at one or more of compute nodes 520) and data stored remotely (which may be accessible by format independent data processing service 220. Leader node 510 may also manage the communications among compute nodes 520 instructed to carry out database operations for data stored in the processing cluster 500. For example, node-specific query instructions 514 may be generated or compiled code that is distributed by leader node 510 to various ones of the compute nodes 520 to carry out the steps needed to perform query 502, including executing the code to generate intermediate results of query 502 at individual compute nodes may be sent back to the leader node 510. Leader node 510 may receive data and query responses or results from compute nodes 520 in order to determine a final result for query 502. A database schema, data format and/or other metadata information for the data stored among the compute nodes, such as the data tables stored in the cluster, may be managed and stored by leader node 510. Query planning 512, as discussed in more detail below with regard to FIG. 6, may account for remotely stored data by generating node-specific query instructions that include remote operations to be directed by individual compute node(s).

Processing cluster 500 may also include compute nodes, such as compute nodes 520a, 520b, and 520n. Compute nodes 520, may for example, be implemented on servers or other computing devices, such as those described below with regard to computer system 2000 in FIG. 17, and each may include individual query processing "slices" defined, for example, for each core of a server's multi-core processor, one or more query processing engine(s), such as query engine(s) 524a, 524b, and 524n, to execute the instructions 514 or otherwise perform the portions of the query plan assigned to the compute node. Query engine(s) 524 may access a certain memory and disk space in order to process a portion of the workload for a query (or other database operation) that is sent to one or more of the compute nodes 520. Query engine 524 may access attached storage, such as 522a, 522b, and 522n, to perform local operation(s), such as local operations 518a, 518b, and 518n. For example, query engine 524 may scan data in attached storage 522, access indexes, perform joins, semi joins, aggregations, or any other processing operation assigned to the compute node 520.

Query engine 524a may also direct the execution of remote data processing operations, by providing remote operation(s), such as remote operations 516a, 516b, and 516n, to remote data processing clients, such as remote data processing client 526a, 526b, and 526n. Remote data processing clients 526 may be implemented by a client library, plugin, driver or other component that sends request operations, such as request operation(s) 532a, 532b, and 532n to format independent data processing service 220. As noted above, in some embodiments, format independent data processing service 220 may implement a common network endpoint to which request operation(s) 532 are directed, and then may dispatch the requests to respective processing nodes, such as processing nodes 540a, 540b, and 540n. Remote data processing clients 526 may read, process, or otherwise obtain results from processing nodes, including partial results of different operations (e.g., aggregation operations) and may provide operation result(s), including result(s) 534a, 534b, through 534n, back to query engine(s) 524, which may further process, combine, and or include them with results of location operations 518. The request operations may include operations to distribute results (as part of relocating data sharing operations from compute nodes 520) so that operation results 534 may be sent to both the requesting remote data processing client 526, one or more other remote data processing clients 526, and/or both the requesting and other remote data processing clients 526. As discussed in detail below with regard to FIG. 17, compute node(s) 520 or remote data processing clients 526 may exchange operation agreement communications 550 in order to determine whether the results of a request operation were successfully completed to all nodes that were supposed to receive the results of a requested remote operation 532. If not, the requested operation may be retried, in some embodiments.

Compute nodes 520 may send intermediate results from queries back to leader node 510 for final result generation (e.g., combining, aggregating, modifying, joining, etc.). Remote data processing clients 526 may retry operation request(s) 532 that do not return within a retry threshold. As format independent data processing service 220 may be stateless, processing operation failures at processing node(s) 540 may not be recovered or taken over by other processing nodes 540, remote data processing clients 526 may track the success or failure of requested operation(s) 532, and perform retries when needed.

Attached storage 522 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 6:
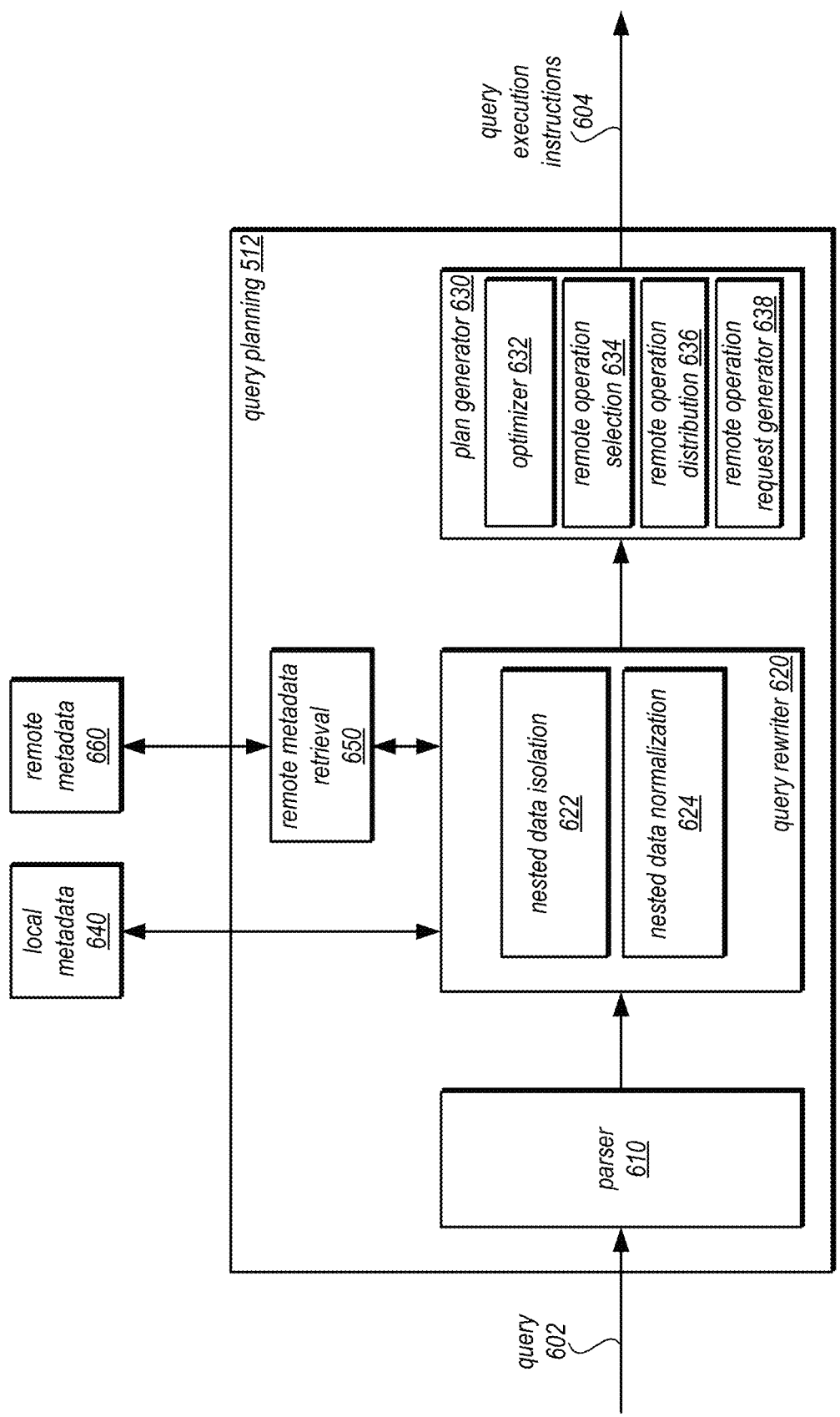
FIG. 6 is a logical block diagram illustrating an example query planning engine that generates query plans that combine nested data operations for distributed query processing, according to some embodiments.

FIG. 6 is a logical block diagram illustrating an example query planning engine that generates query plans that combine nested data operations for distributed query processing, according to some embodiments. Query planning 512 may implement parser 610 to receive a query statement, such as a SQL statement, and determine the various requested operations to perform as a result of the query. For example, parser 610 may generate a query or syntax tree for a given query input string to separate out the various query clauses, fields, predicates, conditions, commands, or other query information for planning and optimization. Query planning 512 may implement query rewriter 620 to rewrite the parsed query based on metadata that describes both the local data and/or remote data. For example, as illustrated in FIG. 6, query rewriter 620 may have access to local metadata 640 (e.g., table descriptions or definitions, including the names and data types of each column, physical information (e.g., partitions information), number of rows, number of distinct values, value ranges, value cardinality, value distribution, indexes, views, etc.), to rewrite portions of a parse tree, such as changing the location or ordering of predicates, join operations, or other portions or operations in the query tree.

As portions of query 602 (or all of query 602) may be directed to remote data, query rewriter 620 may rely upon metadata describing the remote data, such as remote metadata 660 (e.g., table or descriptions definitions, including the names and data types of each column, physical information (e.g., partitions information), number of rows, number of distinct values, value ranges, value cardinality, value distribution, indexes, views, etc.), to perform query rewrites to optimize execution of portions of the query with respect to remotely stored data. While a client of the processing cluster could provide remote metadata 660 (e.g., as query hints), in some embodiments query planning 512 may implement remote metadata retrieval 650 which may request remote metadata 660 from different sources.

For example, remote metadata may be stored as part of an external data catalog service. When parser 610 parses query 602, a check may be performed to see if metadata for the referenced data in query 602 is found in local metadata. If not, remote metadata retrieval 650 may send a request to a remote data source, such as a metadata service or another service storing the remote data (e.g., to a database service or object storage service storing the data). In some embodiments, query 602 may include references to remote data according to a default schema name that may allow for the check in local metadata 640 to be skipped and a request for remote metadata 660 sent. Query rewriter 620 may perform similar rewrite operations as discussed above with respect to operations or portions of the parsed query to be executed remotely at format impendent data processing service 220, such as changing the location or ordering of predicates, join operations, or other portions or operations in the query tree.

In at least some embodiments, query rewriter 620 may implement nested data isolation 622 to apply one or more rewrite rules to isolate sub-expressions or any other portions/fragments of a query that reference nested data (e.g., that refer to a single iteration over the top-level of a remote table or data object specified in a query, such as an object in data storage services 230), as discussed in more detail below with regard to FIGS. 7A-7B. For example, nested data may be indicated in features or portions of query 602 (e.g., a particular operator, keyword, or naming convention to indicate which tables contain nested data) and/or based on remote metadata 660 that is retrieved. Nested data isolation 622 may use a "virtual" table (or tables) as may be specified by a subquery request other operation for remote data processing a query plan that indicates membership in the "virtual" table, in some embodiments. The number of subquery requests may, in some embodiments, be determined according to the number of iterations to be made over a top-level (e.g., of the nested data) in order to perform the query. If, for instance, more than one iteration over the top-level may need to be performed in order to perform the query, then a corresponding subquery request may be included in the rewritten query (e.g., 4 iterations could result in the inclusion of 4 subquery requests).

In some embodiments, the subquery request included by nested data isolation may specify as "interface attributes" those attributes of the remote data of each function/operation argument of the outer query that has inputs from both the relational (e.g., local) and remote side and/or makes to the output, in some embodiments. In some embodiments, a subquery request may not perform object-level (e.g., for remote data within a nested data) partial group by and order by operations, or order by and limit operations. Top-level operations that may be included, in some embodiments, are group by, order by, or limit. In other embodiments, more or less operations on nested data may be supported.

Query rewriter 620 may treat results from a subquery as a "virtual table" other operations can also be applied to or included with it that are appropriate to optimize performance of a database query (e.g., pushing down aggregation operations, filtering, semi-joins, etc.).

In some embodiments, algebraic operators may be included in the subquery requests (or interpreted from the subquery requests at processing nodes of format independent data processing service 220.

Query rewriter 620 include operations or other information that triggers the performance as part of the request at processing nodes, operations such as a "Scan" operation and an "Unnest" operation, in some embodiments. For example, "Scan" may allow a single input table and parameters such as scannedCollection which may be a schema or catalog name for which the evaluation of the scannedCollection is expected to evaluate into a collection, scanVariable may be a string and conceptually stand for the variable that is scanning over the scannedCollection. Another parameter may be extractedExpressions, an array of terms, where the term base case may be scanVariable, ScanId and Column. Another parameter may be Conjuncts Filter, which may be one or more terms that are expected to evaluate to true false, or null (some of them may use the empty(Collection Filter Result). Another parameter may be Collections Conjunct Filter, which may be a paths tree that may cross collections.

In some embodiments, the "Unnest" operation may allow a single input table, and parameters such as join type (e.g., inner or left), scannedCollection (e.g., same as above), scanVariable (e.g., same as above), extractedExpressions (e.g., same as above), ConjunctsFilter (e.g., same as above), Collections Conjunct Filter (e.g., same as above). In some instances, for Unnest, in the inner join type case, for each tuple of the input and each element e of the scanned collection that passes a filter, a tuple may be output that has all the columns of the input and a column for each extracted expression. In the left join type case for Unnest, even if the scanned collection is empty, there may be an output tuple, which may be padded with nulls.

In some embodiments, other operations may be included in a subquery request by query rewriter 620, such as MergeAgg, that may deal with nested (or other scalar data). For example, MergeAgg may include parameters such as DeterminingGroupBy list, which may be a list of columns that functionally determines the rest of the groupBy list, Determined GroupBy list, which may be a list of terms, the parts of the groupby list that do not determine the grouping, aggregate functions list, which may list an aggregate function and one or more terms that describe the input tuples fed into the function, target list, which may be terms that refer to the groupby list and the aggregates and further combine them in scalar ways, and a filter.

An example of a rewrite with appropriate parameters to invoke a subquery (e.g., in addition to those other examples discussed below with regard to FIGS. 7A-9C) may be where a top level element in the nested data in the remote data may be expressed as:

{out:<some scalar>,$n$:[<somescalar>],$m$:[<somescalar>], ... } and a query:
  SELECT remote_table_v.out, SUM(m) as summ
  FROM remote_table_v sv, local_table_v rv, sv.n n, sv.m m
  WHERE n=rv.j AND rv.foo=3
  GROUP BY sv. out The rewritten query that isolates or otherwise combines subquery expressions may be:
  SELECT sv1.out, SUM(sv1.m) AS summ
  FROM local_table_v rv,
    remote subquery(SELECT sv.out AS out, n AS n, m AS m FROM remote_table_v sv, sv.n n, sv.m m) sv1
  WHERE sv1.n=rv.j AND rv.foo=3
  GROUP BY sv1.out Thus, the query engine for a processing cluster may treat the subquery result as a table (e.g., treat result "sv1" as a table). In some instances where this subquery "table" ends up in the left corner of a join and the local_table tuples with foo=3 are few, then further optimizations to rewrite the query may be used to include "AGG PARTIAL sv1.out, SUM(sv1.m) as summ Scan with filter sv1.n IN ?rv.j subquery (SELECT sv.out AS out, n AS n, m AS m FROM remote_table_v sv, sv.n n, sv.m m) sv1, where rv.j may be the collection of values that will be pushed down to the remote processing platform, in some embodiments.

The following plan may be generated based on the above example:
HashAgg PARTIAL [sv_out], SUM(m) AS summ
  MergeAgg [sv_id], [sv_out], SUM(var_m)
    ScanNav Inner, sv_m->m, {var_m: m}, no filter
      ScanNav Inner, sv_n->n, {var_n: n, n_id: nid}, n IN ?rv.j, no filter
        ScanNav Inner, S->sv, svid [sv.n: sv.n, sv.m: sv.m, sv.id: sv_id, sv_out: sv_out}, no filter
          Ground The above example may present further optimization that can be done using other rewrite rules with respect to join ordering by unfolding n first, then unfolding m. Another optimization could be applied, instead of repeating iteration over sv.m for each qualifying n, an optimized version may attempt to produce ac common sub-expression that computes the SUM(m) for each Sv, then multiplies it by the number of qualifying's of the sub-expression optimization since it is very particular to the uncommon feature of the user query of this example, which iterates over the n's in the FROM clause.

In some embodiments, multiple FROM and WHERE steps may be layered, without having every time to pack or unpack the results with SELECT and navigations because FROM and WHERE are already standalone functions that receive bindings and output bindings.

FIGS. 7A and 7B illustrate an example rewrite of a query that isolates nested data, according to some embodiments (which may be performed as part of nested data isolation 622 in FIG. 6 or in other embodiments). Various isolation rewrite rules or criteria may identify sub-expressions in a query that can be included in a subquery for nested data. For instance, in FIG. 7A query 710 may include the sub-expressions "remote_table s", "s.nested n", "n.d" and "EXISTS (SELECT 1 FROM s.secondnested n2 WHERE n2.c=1)" which may refer to data of the same "remote_table s scan" (which may be identified for this scan by its root "remote_table s"), which could be obtained from a same remote scan operation as indicated at 712 and may involve no other data (in this example). Once identified, isolation rewrite rule(s) may be applied. For example, FIG. 7B may illustrate the rewritten query 720 to that isolates and combines subquery expressions as indicated at 722. The remote subquery operation may include a scan for data initiate according to the "SELECT n.d AS d, n.b AS b FROM remote_table s, s.nested n" and apply the combined predicates "WHERE EXISTS {SELECT 1 FROM s.secondnested n2 WHERE n2.c=1>" The result from the remote subquery may be treated as a table "iq" which may be used to complete the query. All though the above examples discuss some isolation rewrite rules, various other isolation rewrite rules or scenarios may be implemented to recognize and combine sub-expressions that only refer to a remote table in a subquery, and thus previous examples are not intended to be limiting.

In some embodiments, query rewriter 620 may implement nested data normalization 624. Nested data normalization 624 may perform rewrites to a query to create an intermediate rewrite query that can then be isolated according to the various techniques implemented by nested data isolation 622, as discussed above (and below), in those scenarios where the nested subqueries cannot emerge by the mere picking of subexpressions in the original client SQL query, in some embodiments. Nested data normalization 624 may evaluate the query prior to nested data isolation 622, in some embodiments, in order to rewrite the query into an intermediate query that then nested isolation can evaluate to produce the final rewritten query. There are various scenarios in which nested data normalization 624 may be applied.

One of the rewritings employed by nested data normalization 624 may be to perform the id-based decorrelation of subqueries, in some embodiments. Consider the following scenario where a query "SELECT . . . FROM . . . WHERE . . . , where the SELECT clause or the WHERE clause of the query have a SELECT . . . FROM . . . WHERE . . . subquery. Unlike the example discussed above with regard to FIG. 7A, this subquery refers to a remote table but does not refer exclusively to this remote table. Instead, the subquery may also refer to a local table or other remove table or even other scans of the same remote table. Thus, may not be a "sub-expression" that the nested data isolation 622 can pick to include in a subquery for nested data. However, the subquery may have its own subexpressions that refer exclusively to a remote table and the same scan of that remote table. The decorrelation technique may eliminate, remove, or otherwise transform the subquery and rewrite it so that the subquery can be divided into portions in an intermediate query that nested data isolation 622 can combine into a subquery for nested data.

For example, consider the client query 810 in FIG. 8A. Notice the EXISTS subquery now also refers to "r.c", which as indicated at 812 may not be a subexpression that exclusively refers to the remote_table s (or scan thereof), in some embodiments. Nested data normalization 624, however, can rewrite the query as intermediate query 820 as illustrated in FIG. 8B, which may now include portions that could be obtained from the same remote scan operation as indicated at 822, and thus may allow nested data isolation 622 to perform further rewrites because the sub-expressions do exclusively refer to the remote_table s.

Notice that query 820 may use an extension "AT <id var>" (e.g., a Structured Query Language (SQL) extension) in order to allow each variable of the FROM clause to associate with an <id var>, whose values will be unique identifiers, in some embodiments. In the case of a query engine or planner like that implemented for data processing service 210 these identifiers can be the local_table row identifiers. In the case of remote tables, the associations can denote counters: The first tuple of remote_table s will be associated with sid=1, the second one with sid=2, and so on, in some embodiments. Similarly, the first tuple of the nested array nested may be associated with nid=1, the second one with nid=2, and so on. The specifics of the syntax by which associations to an id to each variable of the FROM clause could be different, and thus alternate syntax and alternate mechanisms could be devised in other embodiments. Similarly, it does not matter what exactly are the identifiers, if the identifiers are unique, in some embodiments.

Nested data normalization 624 may perform other rewrites using various other rewrite to handle other scenarios (e.g., different clauses, operations, or sub-expressions) to prepare an intermediate rewrite of a query for nested data isolation 622. For example, in some embodiments, nested data normalization 624 may perform rewriting of JOIN and LEFT JOIN expressions. For example, item(s) of each remote subquery operation (e.g., the "FROM" clause) may be rewritten so that they appear as a left deep INNER JOIN sub-expression in the query FROM clause. For example, a rewrite may be:

```
remote sub query (
    FROM local_table r LEFT JOIN (
        remote_table s INNER JOIN
        s.nested n
        ) ON r.a = s.b
    . . .
    )
```

In some embodiments, the query FROM clause may be a left deep INNER JOIN expression, whose leaves are local-only sub-expressions or remote table navigations. For example, as illustrated in FIG. 9, query features 910 may include a "FROM" clause that is a left deep inner join expression. Rewrite rules may be applied to generate an intermediate rewrite of the query 912 and fully rewritten query 920.

In some embodiments, the query FROM clause may be a left deep INNER JOIN or LEFT JOIN expression, where operations to "un-nest" do not include ON conditions. In such scenarios a starting query may include features such as:

```
FROM (
    (local_table1 r1 LEFT JOIN local_table2 r2 ON r1.c = r2.d)
    LEFT JOIN remote_table s ON r.a=s.b
    )
INNER JOIN s.nested n
``` and the normalized, rewritten intermediate query may include features such as:

FROM (local_table1 r1 LEFT JOIN local_table2 r2 ON r1.c=r2.d)

INNER JOIN (remote_table s INNER JOIN s.nested n)

ON r.a=s.b so that the rewritten query with isolation may include features such as:

```
FROM (local_table1 r1 LEFT JOIN local_table2 r2 ON r1.c = r2.d)
INNER JOIN (remote sub query (
                  remote_table s INNER JOIN s.nested n
                  )
ON r.a=s.b
```

In some embodiments, in addition to the above examples or scenarios, LEFT JOINS may include ON conditions when the ON conditions do not correlate to the local table. In some embodiments, LEFT JOINS may include arbitrary ON conditions (e.g., regardless of whether the ON conditions correlate to the local table), or other scenarios such as rewrites to handle arbitrary expressions (e.g., left deep, right deep and anything between) involving INNJER JOIN, LEFT JOIN, and FULL OUTER JOIN. In such scenarios, the rewritten plans may be extended to include GROUP FILTERS and Scan IDS as well as full outer joins, in some embodiments.

Nested data normalization 624 may visit a parse or symbol tree for a query from bottom up the FROM left-deep expression and perform rule-based rewritings according to the rules listed below, in some embodiments. In some embodiments, when all remote data navigations of the FROM stem from the same top level scan, the FROM expression can have a single subexpression that entails all the remote data navigations. If there are multiple top level remote data scans, then there may be correspondingly many sub-queries, each one having a top level scan and the unnestings that dependent on it, in some embodiments.

In some embodiments, the rewritten FROM expression may include the special operator GroupFilter[filter, Determining GroupBy Attributes, Determined Group By Attributes] which may apply the filter to each input tuple and if a tuple satisfies the filter, output the tuple and if a tuple does not satisfy the filter, keep the attributes of Determining Group By Attributes, and Determined Group By Attributes as is and turn all the other attributes to null, and output the resulting tuple only if the same tuple was not output earlier. GroupFilter can be written using Group By and Case operations, in some embodiments.

In some embodiments, nested data normalization 624 may apply rules-based decision engine for rewriting. In some embodiments, rewrite rules may include, but are not limited to:

- (R r INNER S s ON $c_{rs}$) LEFT s.n n ON $c_{sn}$ may be rewritten as R r INNER (S s LEFT s.n n ON $c_{sn}$) ON $c_{rs}$
- Assuming the presence of a LEFT JOIN condition $c_{rsn}$ that involves attributes from all three of r, s and n, where (R r INNER S s ON $c_{rs}$) LEFT s.n n ON ($c_{sn}$ AND $c_{rsn}$) may be rewritten as GroupFilter[$c_{rsn}$, r.id s.id, rs](R r INNER (S s LEFT s.n n ON $c_{sn}$) ON $c_{rsn}$). This rule may not yet consider how to further transform an expression that has GroupFilter. Thus, in some embodiments may be assumed that this rule may only be applied at the top, or more generally, no further isolation is needed after the application of this rule, however in other embodiments rules to rewrite GroupFilter may be applied.
- (R r LEFT S s ON $c_{rs}$) LEFT s.n n ON $c_{sn}$ may be rewritten as R r INNER (S s LEFT s.n n ON $c_{sn}$) ON $c_{rs}$
- A generalization of the previous rule may be applied upon an assumption that the presence of a LEFT JOIN condition $c_{rsn}$ that involves attributes from all three of r, s, and n. (R r LEFT S s ON $c_{sn}$) LEFT s.n n ON ($c_{sn}$ AND $c_{rsn}$) may be rewritten as GroupFilter[$c_{rsn}$, r.id s.id, rs] (R r LEFT (S s LEFT s.n n ON $c_{sn}$) ON $c_{rs}$)
- (S s LEFT R r ON $c_{rs}$) LEFT s.n n ON $c_{sn}$ may be rewritten as (S s LEFT s.n n ON $c_{sn}$) LEFT R r ON $c_{rs}$
- OPEN: The generalization of the above rule but applied to $C_{rsn}$
- OPEN: (R r LEFT S s ON $c_{rs}$) INNER s.n n ON erg' may be rewritten as tighten($c_{rsn}$, R r LEFT S s ON $c_{rs}$) INNER s.n n ON erg'. This rule may apply when $c_{rs}$ fails nulls. The function tighten(filter, expression) may evaluate (e.g., walk) the expression and turn any LEFT expression whose right hand side may define a variable that participates in $c_{rsn}$ into an INNER expression.

The previous rewrite rules may be interpreted in light of the forgoing statements, in some embodiments. "E v" stands for an expression that defines the variables v=[$v_1, \ldots, v_n$]. For example, (R rv INNER S sv) LEFT sv.n is an expression that defines the variables [rv, sv, nv]. Any expression R or starting with R may be local tables. Any expression S or starting with S may be remote tables. If there are sets of variables v and w the condition $c_{vw}$ stands for a condition that involves at least one variable of v and at least one variable of w. If there is a set of variables v, then a variable v may stands for one of the variables of v. The notation v. id stands for the id's (of the data) bound to each of the variables of v, in some embodiments.

In some embodiments, an algorithm maybe implemented to achieve the ordering may be based on a modification of INGRES optimization, wherein unfold constrained loops before unfolding unconstrained loops and progressively expand the list of constrained loops.

Figure 10B:
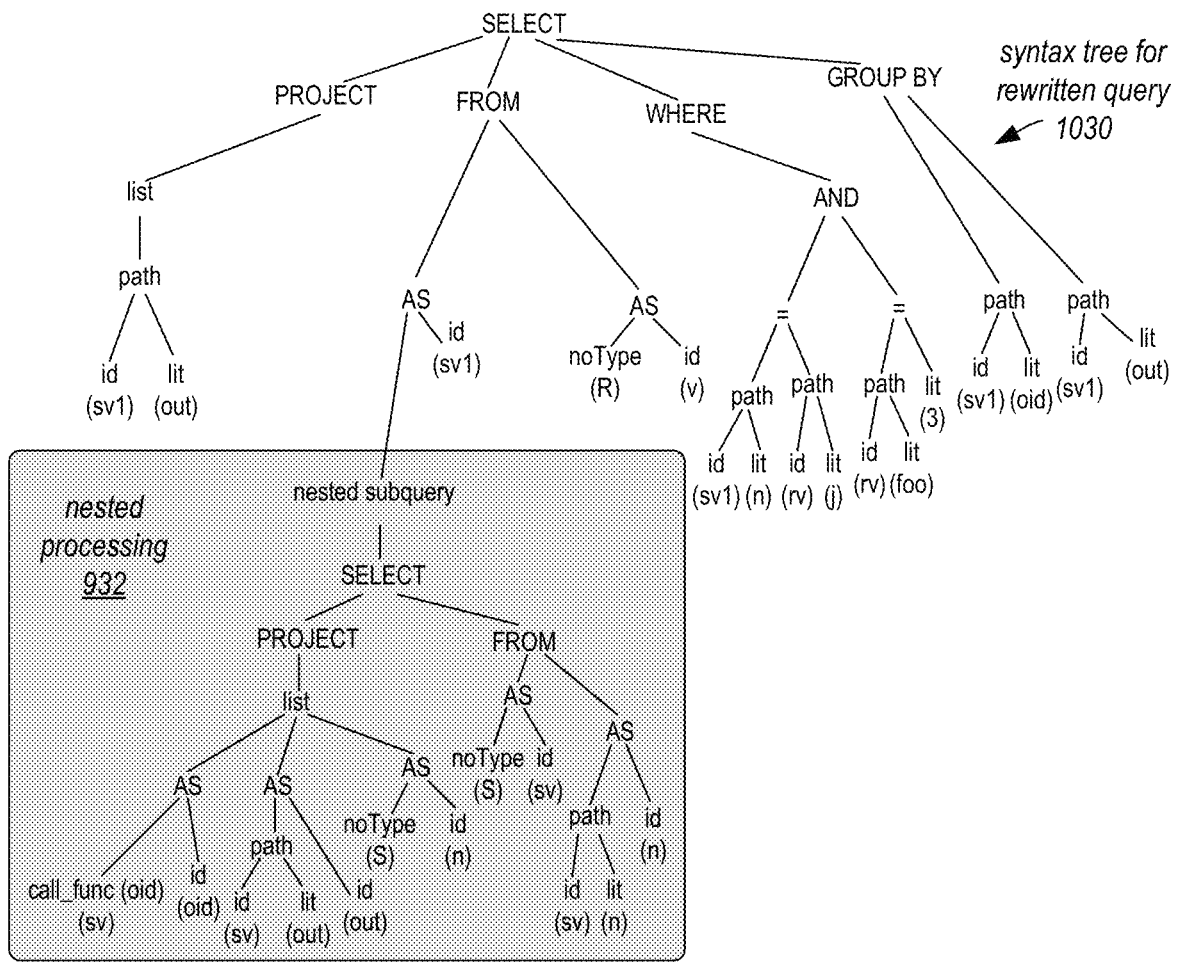

Another example query and rewrite is illustrated in FIGS. 10A-10B. Query 1010 illustrates an example of a doubly correlated EXIST query, in some embodiments. According to the rewrite techniques discussed above, intermediate rewrite 1012 and rewritten query 1020 may illustrate the inclusion of a subquery that has included subexpressions to the remote table S. Syntax tree 1030 in FIG. 10B illustrates an example of the portions of the query plan performed using nested query processing capabilities (e.g., at remote processing nodes as in FIG. 5) 932. In the example of FIGS. 10A-10B, GROUP BY may be a duplicate eliminator. In some embodiments, assuming not too many tuples from table R with foo=3 may result in a rewrite that pushes the filter within the subquery. The aggregation may also be pushed within the subquery, in some embodiments.

Figure 11B:
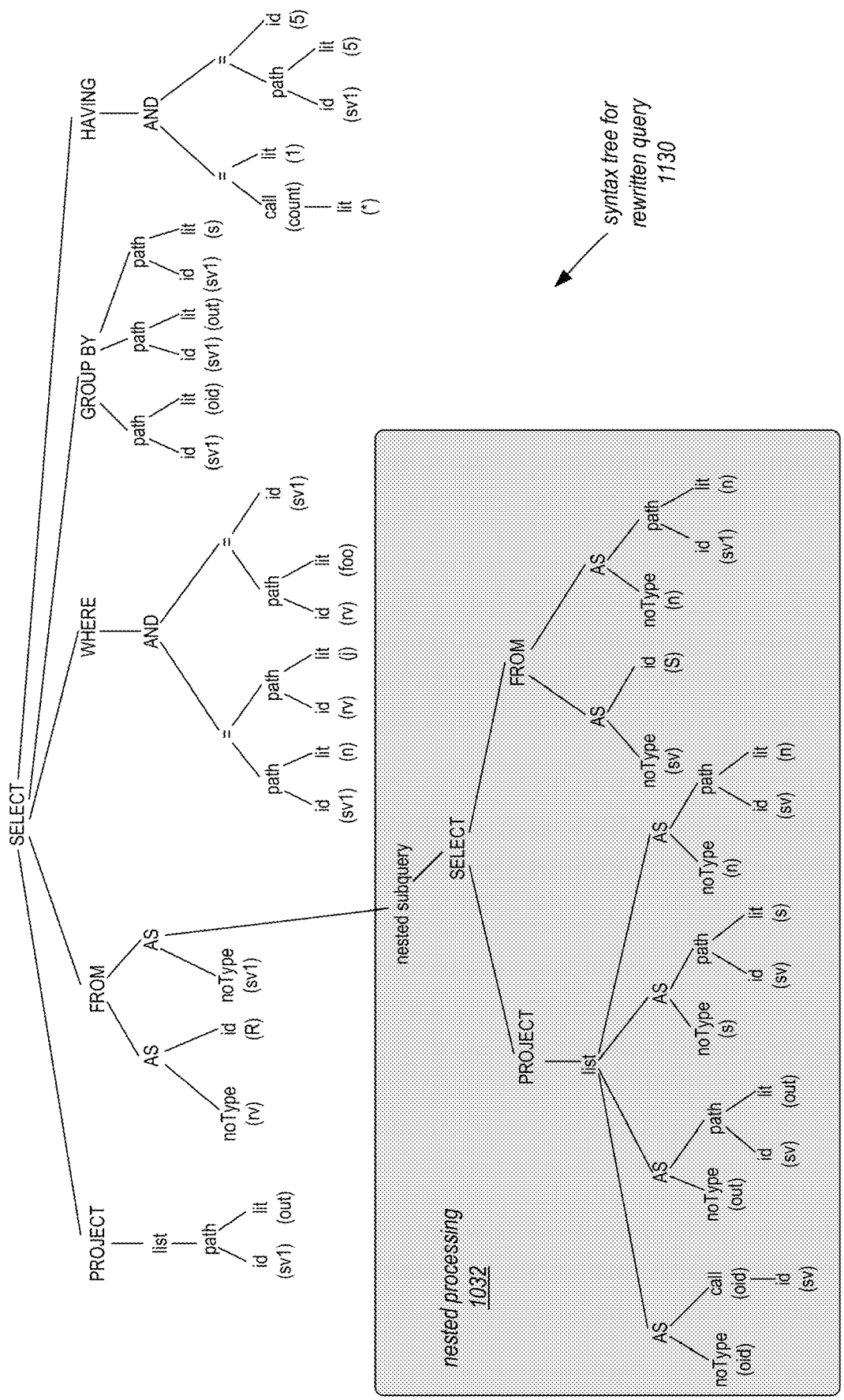
Figure 16:
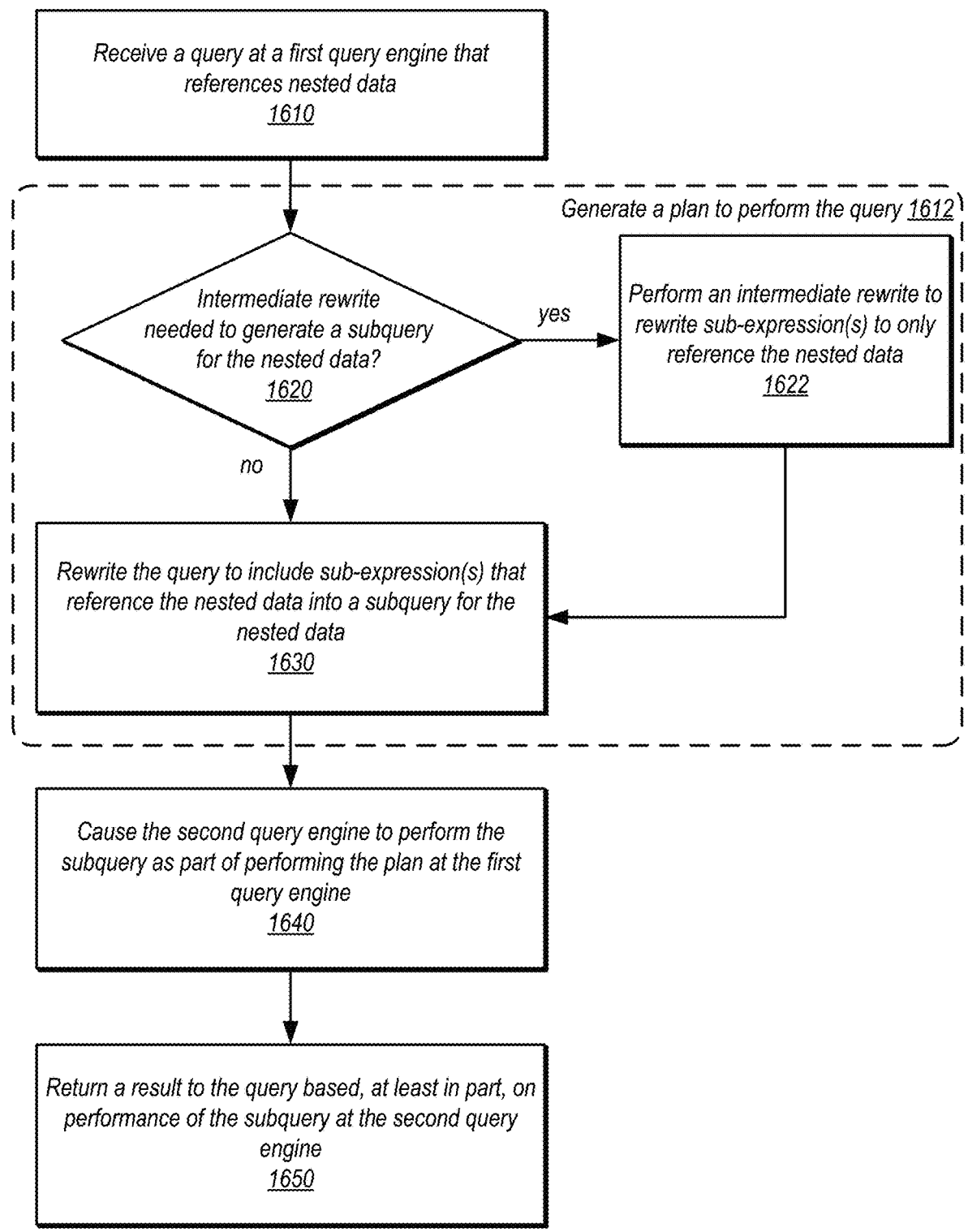
FIG. 16 is a high-level flowchart illustrating methods and techniques to implement combining nested data operations for distributed query processing, according to some embodiments.

Another example query and rewrite is illustrated in FIGS. 11A and 11B. Query 1110 illustrates an example of a query with a scalar subquery in WHERE clause, in some embodiments. In some instances, HAVING clause can be pushed down to remote processing. According to the rewrite techniques discussed above, intermediate rewrite of the query 1112 and rewritten query 1120 may illustrate the inclusion of a subquery that has combined operations to the remote table S. Syntax tree 1130 illustrates an example of the portions of the query plan performed remotely 1132. In the example of FIGS. 11A-11B, the filter may be pushed down within the subquery. The aggregation may also be pushed within the subquery (not illustrated).

Another example query and rewrite is illustrated in FIG. 12. Query 1210 illustrates an example of a query with an aggregate doubly correlated subquery in the WHERE clause 1210, in some embodiments. According to rewrite rules for WHERE clauses, similar to those discussed above, normalized query 1220 may be generated. Then isolation may be applied to generate the rewritten query with isolation, as indicated at 1230.

Another example query and rewrite is illustrated in FIG. 13. Query 1310 illustrates an example of a query with a doubly-correlated EXISTS and aggregation 1310, in some embodiments. The query planner may identify the back-to-back aggregations to perform the rewrite, in some embodiments, according to rewrite rules for EXISTS clauses. According to the rewrite rules, intermediate rewrite 1312 and rewritten query 1320 may illustrate the inclusion of a subquery that has combined operations to the remote table S. In some embodiments, the rewritten query 1320 may include as part of the subquery the GROUP BY operation because the GROUP BY may be one that can be localized per top-level element of the remote table R and thus may not have to also have a PARTIAL modifier.

Another example query and rewrite is illustrated in FIG. 14. In some embodiments, aggregate operations, such as a summation, count, and so on, may include both local and remote table variables with nested data. A rewrite rule (or multiple rules) to account for the presence of references to both tables in the aggregation operation may be applied. For example, query 1410 illustrates an example of a query with nested query decorrelation, in some embodiments. According to the rewrite rules discussed above intermediate rewrite 1412 and rewritten query 1420 may illustrate the inclusion of a subquery that has combined operations to the remote table S. Aggregates that involve both R and S variables may push more than semi-join sets, such as tables as literal values in the FROM clause. In the rewritten query 1420, pairs of rv.offset and rv.j may be pushed down (and could do the same for any plane table scenario).

Rewrite rules may be applied to normalize queries with WITH clauses, in some embodiments. For example, as illustrated in FIG. 15, a query may be received with a WITH clause 1510. An intermediate 1512 and final rewrite of the query 1520 may be performed according to the various rewrite rules, such as those discussed above. In cases where the WITH/FROM clause needs to be unfolded, in some embodiments, all WITH clauses may be turned into FROM subqueries by replacing temp table names with the respective subqueries (not illustrated in FIG. 14).

Query rewriter 620 may also perform other rewrites, in some embodiments, in addition to those for query isolation and normalization. For example, as noted above, remote data processing operations may include operations that scan operations that filter or project data results, aggregation operations that aggregate data values and provide partial or complete aggregation results, sorting, grouping, or limiting operations that organize or reduce the determined data results from remote data. More generally, query rewriter 620 may apply various rules-based selection techniques to determine which operations should be pushed down or assigned for remote data processing at format independent data processing service (e.g., in addition to those identified as remote subquery operations according to isolation 622 and/or normalization 624 rewrites discussed above. In some embodiments, modifications to a query plan may be implemented or performed dynamically based on intermediate results from previously executed portions of the query plan. For example, conditional statements or other logical operators may be included in the query plan that indicate which operation to perform locally or direct remotely based on the intermediate results of previously performed operations.

Some operations may be partially performed. For example, aggregation operations, may not be completed before results are transmitted to the compute node. Instead, the compute node may aggregate a stream of partial results (e.g., as discussed with regard to FIG. 13 below) to determine the complete aggregation results for the remote aggregation operation. Then, the compute node perform operations to combine or otherwise process the aggregation results with other operations performed by the compute node (e.g., local data processing operations) and provide both remote and local processing results to a leader node for global aggregation across all compute nodes in the processing cluster. Query rewriter 620 may implement greedy selection algorithms to select operations for remote data processing. However, in some embodiments, remote operations election 634 may decline to push or assign operations for remote processing that could be pushed or assigned based on a cost analysis. For example, depending on the cardinality of an aggregation operation (e.g., number of results for values being aggregated), assigning partial aggregation operation may not be beneficial. If the number of result values is large, then remote processing aggregation may not beneficial as the problem size for executing the aggregation would not be reduced if performed remotely, wasting processing, memory, or other resources.

The rewritten query may then be provided to plan generator 630. Plan generator 630 may perform various operations to generate a query execution plan for the rewritten query (e.g., a tree of plan operation nodes, which may be later used to generate query execution code). For example, plan generator 630 may perform an optimization 632 to select one of various combinations or orderings of plan operator nodes in a tree produces a least costly plan to execute. In at least some embodiments, plan generator 630 may obtain or estimate statistics for remote tables which may include nested data, including statistics such as the cardinality of top-level collection, equidepth histograms and MCVs for each top level attribute, average cardinality (e.g., fanout) for nested collections, histograms, MCVS for inner attributes expressed as if the nested collection was unfolded, in some embodiments. In some embodiments, optimization 632 may be performed before rewrite of the query for isolation 622 or normalization 624, or may be performed dynamically response to the rewrites of isolation 622 or normalization 624.

Remote operation selection 634 may modify the query plan to include data plan operation nodes that correspond to assigned operations. For example, remote operation selection 634 may insert a plan node that represents scanning operations to be directed by a compute node (e.g., compute node 520) and performed at a processing node (e.g., processing node 540) part of a subquery for executing the query. This remote scanning node may identify which operations are assigned for remote execution (e.g., result distribution operations) and may be annotated with a corresponding interface command to execute the operation remotely (e.g., a format independent data processing service 220 API) as well as specific data that should be scanned (e.g., partition, file, table, or other data object identifiers). The remote scanning node may include predicates, regular expressions or other information for projections, filters, or limitations (e.g., a SQL limit clause) to be applied as part of the scan operation.

Another example of a plan node for a remote operation may be a remote aggregation plan node. Different types of associative aggregation operations (e.g., count, minimum value, maximum value, average, summation, deviation, or other statistical calculations) may be identified by the aggregation operation plan node. A grouping indication (e.g., a SQL group by clause) may identify the associate values over which aggregation functions are applied. Another example of a remote planning node for a remote operation may be a remote sort node. Different types of sortation and merge of results obtained from a remote data store can be remotely performed (e.g., a radix sort or other sort operation where partitioned search results can be merged). Another example of a plan node for a remote operation may be result distribution node which may indicate the mapping, function or other input information to determine which nodes should receive a result generated by as part of remote processing, in some embodiments.

Plan generator 630 may implement remote operation distribution 636 to determine which compute nodes may direct (e.g., request and process returned results) remote data processing operations. For example, in at least some embodiments a round-robin distribution scheme may be implemented to ensure that each compute node handles fair share of remote data processing workload. Distribution schemes may account for the number of data objects to be evaluated or the size of data objects to be evaluated when distributing remote data processing operations.

Plan generator 638 may implement remote operation request generator 638. In some embodiments, remote operation request generator 638 may populate a template, message, request, or other data structure for directing remote data processing operations. A remote data processing client, such as remote data processing clients 526 in FIG. 5, may interpret, access, or utilize the data structure to send remote data processing requests to format independent data processing service. In some embodiments, plan generator 630 may generate query execution code or other execution instructions 604 to perform the query plan. The query execution instructions 604 may access data structures generated for remote operation requests to generate code for executing remote data processing operations (including the operations to un-nest or flatten nested data as part of performing a subquery for the nested data), in some embodiments.

Although FIGS. 2-15 have been described and illustrated in the context of a provider network implementing different data processing services, like a data warehousing service, the various components illustrated and described in FIGS. 2-15 may be easily applied to other data processing systems that implement different query engines some of which do implement nested query data capabilities and some of which do not implement nested data processing capabilities. As such, FIGS. 2-15 are not intended to be limiting as to other embodiments of combining nested data operations for distributed query processing. FIG. 15 is a high-level flowchart illustrating methods and techniques to implement combining nested data operations for distributed query processing, according to some embodiments.

Various different systems and devices may implement the various methods and techniques described below, either singly or working together. For example, a query planner for a processing cluster or other data processing platform may implement some or all of the various methods. Different combinations of services implemented in different provider networks operated by different entities may implement some or all of the methods (e.g., a data warehouse cluster in a service of a first provider network, an intermediate data processing service in a second provider network, and a data set stored in a service of a third provider network). Alternatively, various other combinations of different systems and devices located within or without provider networks may implement the below techniques. Therefore, the above examples and or any other systems or devices referenced as performing the illustrated method, are not intended to be limiting as to other different components, modules, systems, or devices.

As indicated at 1610, a query may be received at a first query engine that references nested data, in various embodiments. In some embodiments, the nested data may be stored in a different data store or data structure than is directly accessible to the first query engine, but instead may be accessed by a second query engine (e.g., a data warehouse cluster implementing a first query engine and data processing nodes of a format independent data processing service implementing the second query engine accessing data in an object data store service). Like the example queries discussed above, the query may also include references to data stored locally to the first query engine (or data that does not include references to nested data) and/or may include multiple references to remote or not directly accessible data not all of which may include nested data. Nested data may be any form of scalar or semi-structured data, in some embodiments, that is stored within a data object, file, storage location or structure which may be treated as a table for the purposes of performing the received query, in some embodiments.

As indicated at 1612, a plan to perform the query may be generated, in some embodiments. For example, the query engine may implement a query planner or other query planning component to generate a query plan. In some embodiments, a separate query planner (e.g., separate from the first and/or second query engine) may be implemented to generate the query plan. The query plan may include various operations, expressions, steps, directions, or other information to perform the query. Part of generating the query plan may include accounting for the reference to nested data, in some embodiments.

For example, as indicated at 1620, in some embodiments, a determination may be made as to whether an intermediate rewrite of the query is needed to generate a subquery for the nested. For example, the query may, as discussed above with regard to FIGS. 8A-15 and other rewrite rules, include references to the nested data that cannot be isolated to a single scan operation of the data store that stores the nested data (e.g., a scan of a remote database table, file, or object). In such circumstances, additional rewrite rules may be applied to normalize or otherwise rewrite the query into an intermediate state so that the references to nested data are isolated. For example, in various examples discussed above, rewrite rules for different portions of a query that include nested data (e.g., rewrite rules specific to various clauses, operators, or sub-expressions such as FROM, WHERE, EXISTS, WITH, INNER JOIN, LEFT JOIN, aggregations, and so on) may be applied. An intermediate rewrite of the query may be performed to rewrite one or more sub-expressions (including adding new sub-expressions, removing sub-expressions, or otherwise reformulating sub-expressions) to only reference the nested data, as indicated at 1622 in some embodiments. In this way, the rewritten sub-expressions can be further rewritten into a subquery to the second query engine, in some embodiments.

As indicated at 1630, the query may be rewritten to include one or more sub-expressions that reference the nested data into a subquery for the nested, in some embodiments. For example, rewrite rules may be applied for the various clause, operations, portions or other sub-expressions of the query that reference the nested data as discussed above with regard to FIGS. 7A-15 or other operations, such as aggregations, filters, joins, and so on. As indicated at 1640, in some embodiments, the second query engine may be caused to perform the subquery as part of performing the plan at the first query engine (e.g., by instructing the subquery from compute nodes in a data warehouse cluster to data processing nodes of a format independent data processing service as discussed above with regard to FIG. 5). As indicated at 1650, a result to the query may be returned based, at least in part on a performance of the subquery received from the second query engine, in some embodiments (e.g., including results of the subquery as part of results or to determine results for the query).

The methods described herein may in various embodiments be implemented by any combination of hardware and software. For example, in one embodiment, the methods may be implemented by a computer system (e.g., a computer system as in FIG. 17) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of combining nested data operations for distributed query processing as described herein may be executed on one or more computer systems, which may interact with various other devices. One such computer system is illustrated by FIG. 17. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 2000 includes one or more processors 2010a, 2010b through 2010n coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010a, or a multiprocessor system including several processors 2010a, 2010b through 2010n (e.g., two, four, eight, or another suitable number). Processors 2010a, 2010b through 2010n may be any suitable processor capable of executing instructions. For example, in various embodiments, processors 2010a, 2010b through 2010n may be general-purpose or embedded processors implementing any of a variety of instruction set architectures (ISAs), such as the x86, PowerPC, SPARC, or MIPS ISAs, or any other suitable ISA. In multiprocessor systems, each of processors 2010a, 2010b through 2010n may commonly, but not necessarily, implement the same ISA.

In some embodiments, at least one processor 2010a may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processors 2010a, 2010b through 2010n. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processors 2010a, 2010b through 2010n, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processors 2010a, 2010b through 2010n). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processors 2010a, 2010b through 2010n.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 17, memory 2020 may include program instructions 2025, that implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a physical memory to store program instructions which, when performed by at least one processor, cause the at least one processor to perform a method to at least:
receive a query at a first query engine, the query comprising a reference to data including a database table of a first format and nested data of a second format, wherein the first format and second format are different, and wherein the first query engine directly supports queries to data of the first format and does not directly support queries to data of the second format;
responsive to the receipt of the query:
rewrite, by the first query engine, the query to include one or more sub-expressions of the query that reference the nested data into a subquery for the nested data as part of generating a plan to perform the query at least in part at the first query engine, wherein the plan isolates access to the nested data of the second format from access to the database table of the first format;
send, by the first query engine, a request to a second query engine to perform the subquery for the nested data of the second format not directly supported by the first query engine; and
return, by the first query engine, a result of the query based, at least in part, on a response to the request to perform the subquery received from the second query engine.

2. The system of claim 1, wherein to rewrite the query to include the one or more sub-expressions of the query, the program instructions cause the at least one processor to perform the method to at least perform an intermediate rewrite of the first query to rewrite at least one of the one or more sub-expressions to only reference the nested data.

3. The system of claim 2, wherein the intermediate rewrite replaces the at least one sub-expression of the query with a reference to both a first database table that includes the nested data and a second database table that does not include the nested data with a plurality of sub-expressions that separately reference the first database table and the second database table.

4. The system of claim 3, wherein the first query engine is implemented as part of a processing cluster of a data warehouse service of a provider network, wherein the second query engine is implemented as part of format independent data processing service of the provider network, wherein the second database table is hosted at the processing cluster of a data warehouse service, and wherein the database table is hosted in a data store accessible to the format independent data processing service.

5. A method, comprising:
responsive to a query that includes a reference to data including database table of a first format and nested data of a second format:
causing a first query engine to rewrite the query to include one or more sub-expressions of the query that reference the nested data into a subquery for the nested data as part of generating a plan to perform the query, wherein the first query engine directly supports queries to data of the first format and does not directly support queries to data of the second format, and wherein the plan isolates access to the nested data from access to the database table; and
causing a second query engine to perform the subquery for the nested data of the second format not directly supported by the first query engine as part of performing the plan in order to return a result of the query.

6. The method of claim 5, wherein causing the first query engine to rewrite the query to include the one or more sub-expressions of the query comprises performing an intermediate rewrite of the query to rewrite at least one of the one or more sub-expressions to only reference the nested data.

7. The method of claim 6, wherein the intermediate rewrite replaces with the at least one sub-expression that references both a database table that includes the nested data and a second database table that does not include the nested data with a plurality of sub-expressions that separately reference the database table and the second database table.

8. The method of claim 7, wherein the intermediate rewrite applies one or more rewrite rules to evaluate a FROM clause so that the at least one sub-expression replaced is within the FROM clause.

9. The method of claim 7, wherein the intermediate rewrite applies one or more rewrite rules to evaluate an aggregation operation so that the at least one sub-expression replaced is within an aggregation operation.

10. The method of claim 5, wherein the rewrite of the query to include the subquery for the nested data applies one or more rewrite rules for a WITH clause to replace a portion of the query within the WITH clause.

11. The method of claim 5, wherein the rewrite of the query to include the subquery for the nested data applies one or more rewrite rules for a WHERE clause to replace at least a portion of a scalar subquery within the WHERE clause.

12. The method of claim 5, further comprising causing the first query engine to further rewrite the query to include an aggregation operation as part of the subquery for the nested data to be performed by the second query engine.

13. The method of claim 5, wherein the query is directed to a first database table that includes the nested data and a second database table that does not include the nested data, wherein the first database table is only accessible to the second query engine, wherein the second database table is only accessible to the first query engine, and wherein the method further comprises causing the first query engine to perform those portions of the plan directed to the second database table.

14. A non-transitory, computer-readable storage medium, storing program instructions that when executed by one or more computing devices cause the one or more computing devices to implement:
receiving a query that includes a reference to data including a database table of a first format and nested data of a second format at a first query engine, wherein the first format and second format are different, and wherein the first query engine directly supports queries to data of the first format and does not directly support queries to data of the second format;
responsive to receiving the query:
causing the first query engine to rewrite the query to include one or more sub-expressions of the query that reference the nested data into a subquery for the nested data as part of generating a plan to perform the query, wherein the plan isolates access to the nested data from access to the database table;
sending a request from the first query engine to a second query engine to perform the for the nested data of the second format not directly supported by the first query engine; and returning, by the first query engine, a result of the query based, at least in part, on the performance of the subquery at the second query engine.

15. The non-transitory, computer-readable storage medium of claim 14, wherein, in causing the first query engine to rewrite the query to include the one or more sub-expressions of the query into the subquery, the program instructions cause the one or more computing devices to implement performing an intermediate rewrite of the query to rewrite at least one of the one or more sub-expressions to only reference the nested data.

16. The non-transitory, computer-readable storage medium of claim 15, wherein the intermediate rewrite applies one or more rewrite rules to evaluate join operations so that the intermediate rewrite modifies a LEFT JOIN or INNER JOIN sub-expression in the query.

17. The non-transitory, computer-readable storage medium of claim 15, wherein the intermediate rewrite applies one or more rewrite rules to evaluate a WITH clause so that the at least one sub-expression replaces a portion of the query within the WITH clause with a remote subquery operation.

18. The non-transitory, computer-readable storage medium of claim 15, wherein the intermediate rewrite applies one or more rewrite rules to replace:
   a first portion of the query within a FROM clause that includes references to both a database table that includes the nested data and a second database table that does not include the nested data, and
   a second portion of the query within a WHERE clause that includes the references to both the database table and the second database table,
   with a plurality of sub-expressions that separately reference the database table and the second database table.

19. The non-transitory, computer-readable storage medium of claim 14, wherein the rewrite of the query to include the subquery for the nested data applies one or more rewrite rules for an EXISTS clause to replace at least a portion of a scalar subquery within an EXISTS clause.

20. The non-transitory, computer-readable storage medium of claim 14, wherein the first query engine is implemented as part of a first data processing service, wherein the second query engine is implemented as part of a second data processing service, and wherein the first query engine is not capable of performing query operations over the nested data.

* * * * *